US010819903B2

(12) United States Patent
Fukuya et al.

(10) Patent No.: US 10,819,903 B2
(45) Date of Patent: Oct. 27, 2020

(54) IMAGING DEVICE, INFORMATION TERMINAL, CONTROL METHOD FOR IMAGING DEVICE, AND CONTROL METHOD FOR INFORMATION TERMINAL

(71) Applicant: Olympus Corporation, Hachioji-shi, Tokyo (JP)

(72) Inventors: Yoshiyuki Fukuya, Sagamihara (JP); Kazuhiko Shimura, Hachioji (JP); Hisashi Yoneyama, Hino (JP); Zhen Li, Hino (JP); Atsushi Kohashi, Akiruno (JP); Dai Ito, Hamura (JP); Nobuyuki Shima, Machida (JP); Yoichi Yoshida, Inagi (JP); Kazuhiko Osa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 23 days.

(21) Appl. No.: 16/261,419

(22) Filed: Jan. 29, 2019

(65) Prior Publication Data

US 2019/0253615 A1 Aug. 15, 2019

(30) Foreign Application Priority Data

Feb. 13, 2018 (JP) ................................ 2018-023025

(51) Int. Cl.

| | |
|---|---|
| ***H04N 5/232*** | (2006.01) |
| ***G06N 5/04*** | (2006.01) |
| ***G10L 15/22*** | (2006.01) |
| ***G06N 3/04*** | (2006.01) |
| ***G06N 3/08*** | (2006.01) |
| ***G10L 17/00*** | (2013.01) |

(52) U.S. Cl.
CPC .......... *H04N 5/23222* (2013.01); *G06N 5/04* (2013.01); *G10L 15/22* (2013.01); *H04N 5/232941* (2018.08)

(58) Field of Classification Search
CPC ....... H04N 5/23222; G06N 5/04; G10L 15/22
See application file for complete search history.

(56) References Cited

U.S. PATENT DOCUMENTS

2017/0339340 A1* 11/2017 De Bayser ......... H04N 5/23216
2019/0147620 A1* 5/2019 Pinel .................... G06K 9/6202 382/159

FOREIGN PATENT DOCUMENTS

JP 2015-173307 10/2015

* cited by examiner

*Primary Examiner* — Christopher K Peterson
(74) *Attorney, Agent, or Firm* — John C. Pokotylo; Pokotylo Patent Services

(57) ABSTRACT

An imaging device, comprising an image sensor that images a shooting target and outputs image data, a memory that stores inference models for performing guidance display or automatic control, when shooting the shooting target, an inference engine that performs inference for the control of the guidance display or automatic control, using the inference model, and a controller that determines whether or not the inference model is suitable for shooting a shooting target that the user wants, and if it is determined that the inference model is not suitable for shooting, requests generation of an inference model that is suitable for a shooting target the user wants to an external learning device.

16 Claims, 12 Drawing Sheets

IMAGING DEVICE, INFORMATION TERMINAL, CONTROL METHOD FOR IMAGING DEVICE, AND CONTROL METHOD FOR INFORMATION TERMINAL

CROSS-REFERENCE TO RELATED APPLICATIONS

Benefit is claimed, under 35 U.S.C. § 119, to the filing date of prior Japanese Patent Application No. 2018-023025 filed on Feb. 13, 2018. This application is expressly incorporated herein by reference. The scope of the present invention is not limited to any requirements of the specific embodiments described in the application.

BACKGROUND OF THE INVENTION

1. Field of the Invention

The present invention relates to a an imaging device, an information terminal, a control method for an imaging device, and a control method for an information terminal that perform learning using images stored in a database, of a portable terminal device or camera or the like, and that can provide shooting advice and/or perform automatic control such that it is possible to shoot a suitable photograph (for example, a photograph that receives evaluation from a third party) at the time of shooting.

2. Description of the Related Art

An information management device has been proposed to store image data in a database, and to perform information exchange while maintaining confidentiality between associated terminals (refer, for example, to Japanese patent laid-open No. 2015-173307 (hereafter referred to as "patent publication 1")). This information processing system disclosed in patent publication 1 constructs a database in which feature information of a taken image of a person, position information, and time information, as safety confirmation information at the time of an earthquake etc., are stored in association with each other. With this information management system it is possible to simply search for images that are similar to taken images of a person it is desired to find.

Conventionally, proposals for retrieving an image database in this way are already in effect. Also, it is conceivable to generate an inference model (dictionary) as a result of learning, such as deep learning, and to obtain advice when shooting using this inference model. If the fact that there are various shooting targets is taken into consideration, it is desirable to provide an inference model for each of these shooting targets. However, depending on the shooting target, there may be cases where an appropriate inference model cannot be provided in an imaging device.

It should be noted that an inference model has strength (weighting) of connections joining each of neurons N11 to N2*n*, in an inference engine that will be described later using FIG. 2. An inference model is generated by performing deep learning (machine learning) such that input data match training data. By appropriately selecting input data and training data, it is possible to generate an inference model that is suitable for various shooting targets. Since an inference model is selected in accordance with shooting target, an inference model may sometimes be called a "dictionary".

SUMMARY OF THE INVENTION

The present invention provides an imaging device, an information terminal, a control method for an imaging device and a control method for an information terminal, that can provide precise shooting guidance to a user, when an appropriate inference model is not provided in an imaging device or information terminal, and/or that can perform automatic control.

An imaging device of a first aspect of the present invention comprises an image sensor that images a shooting target and outputs image data, a memory that stores inference models for performing guidance display or automatic control, when shooting the shooting target, an inference engine that performs inference for the control of the guidance display or automatic control, using the inference model, and a controller that, regarding whether or not the inference model is suitable for shooting of the shooting target, compares a value representing operating situation of a specified inference model that is usable, or a confidence value of an inference result at the time of operation of the specified inference model, with a specified value, determines whether or not the inference model is suitable for shooting a shooting target intended by the user based on the result of this comparison, and depending on the determination, if it has been determined that the inference model is not suitable for shooting a shooting target intended by the user, requesting generation of an inference model that is suitable for a shooting target intended by the user to an external learning device.

A control method for an imaging device of a second aspect of the present invention comprises, imaging a shooting target and outputting image data, storing inference models for performing guidance display or automatic control, when shooting the shooting target, in a storage section, performing inference for control of the guidance display, or automatic control, using the inference model, and regarding whether or not the inference model is suitable for shooting of the shooting target, comparing a value representing operating state of a specified inference model that is usable, or a confidence value of an inference result at the time of operation of the specified inference model, with a specified value, determining whether or not the inference model is suitable for shooting a shooting target intended by the user based on the result of this comparison, and depending on the determination, if it has been determined that the inference model is not suitable for shooting a shooting target intended by the user, requesting generation of an inference model that is suitable for the shooting target intended by the user to an external learning device.

An information terminal of a third aspect of the present invention is equipped with artificial intelligence and has an assistant function for voice operation, the information terminal comprising: a voice data output circuit that is input with voice of a user, converts the voice to voice data and outputs the voice data, a communication circuit that performs communication with an imaging device, and a controller that communicates with the communication circuit to be input with information relating to an inference model that is stored in the imaging device, analyzes the voice data, predicts shooting target of the user, based on this prediction, for whether or not the inference model is suitable for shooting of the shooting target, compares a value representing operating state of a specified inference model that is usable, or a confidence value of an inference result at the time of operation of the specified inference model, with a specified value, determines whether or not the inference model is suitable for shooting a shooting target intended by the user based on the result of this comparison, and if the result of this determination is not suitable for shooting, causes learning of an inference model that is suitable for shooting of the shooting target in an external learning device.

A control method for an information terminal of a fourth aspect of the present invention is a control method for an information terminal that has a communication circuit that performs communication with an imaging device, is equipped with artificial intelligence, and has an assistant method for voice operation, the control method comprising: inputting voice of a user, converting to voice data and outputting the voice data, analyzing the voice data, and estimating shooting target of the user, and communicating with the communication circuit to input information relating to an inference model that is stored in the imaging device, based on estimation of shooting target of the user that has been analyzed, for whether or not the inference model is suitable for shooting of the shooting target, comparing a value representing operating state of a specified inference model that is usable, or a confidence value of an inference result at the time of operation of the specified inference model, with a specified value, determining whether or not the inference model is suitable for shooting a shooting target intended by the user based on the result of this comparison, and if the result of this determination is not suitable for shooting, causing learning of an inference model that is suitable for shooting of the shooting target in an external learning device.

DETAILED DESCRIPTION OF THE PREFERRED EMBODIMENTS

Figure 1:
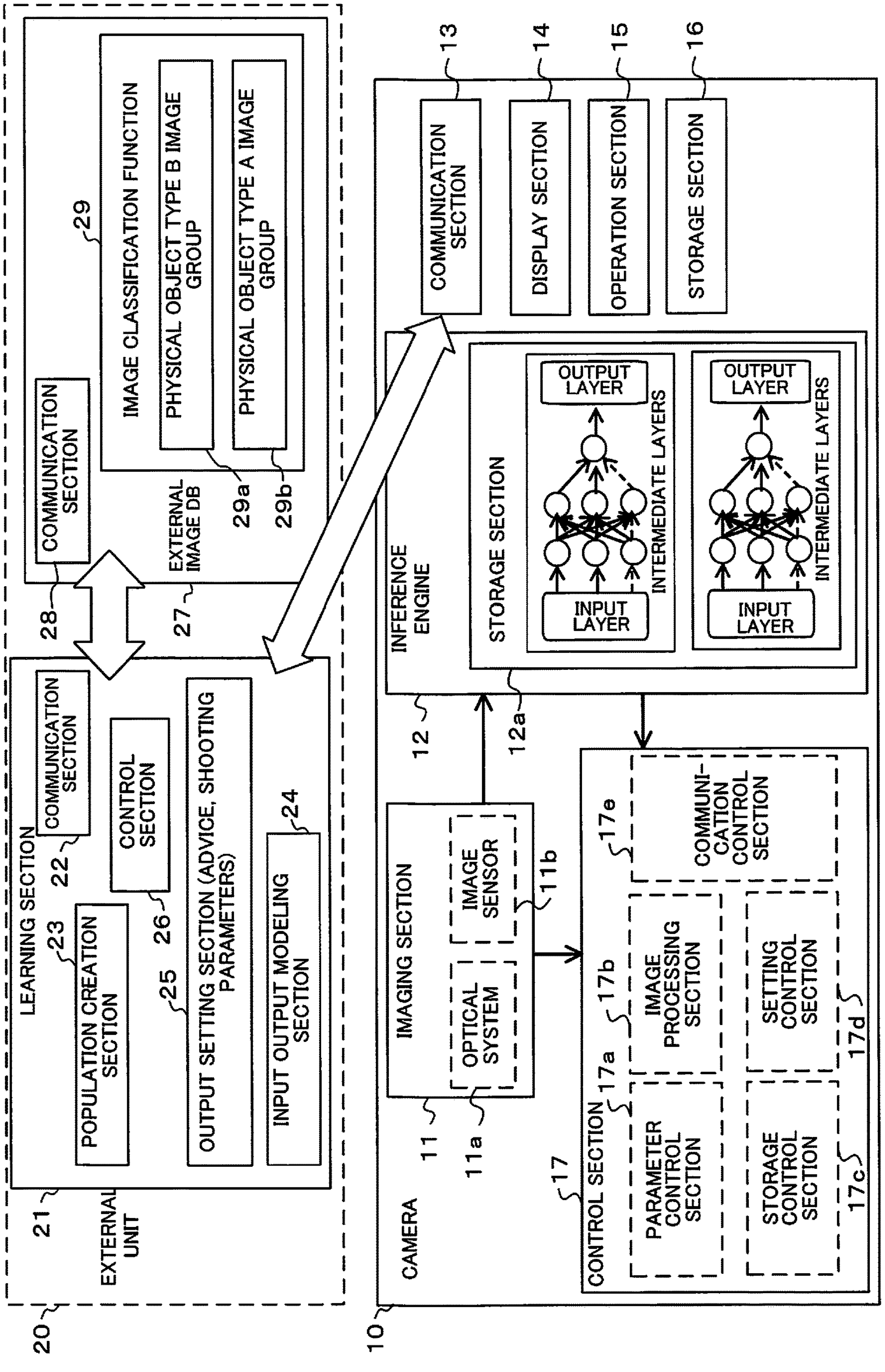
FIG. 1 is a block diagram mainly showing the electrical structure of the imaging system of a first embodiment of the present invention.

An example where the present invention is adopted in an imaging system comprising a camera (imaging device) and an external unit, as a preferred embodiment of the present invention, will be described in the following. An overview of this imaging system is given in the following. The camera can be connected to the external unit via a network. Image data is stored in this external unit, and information such as whether or not an image was properly taken, whether or not an evaluation from a third party is high etc. is stored in association with each item of image data.

Also, the external unit creates a population of image data, performs deep learning (machine learning) by using image data within this population and information that has been associated with this image data as training data (correct solution), and can generate an inference model (dictionary). The camera is input with this inference model (dictionary), and can receive shooting advice (advice display and/or automatic control of the camera) based on the inference model at the time of shooting.

Before shooting the camera predicts a shooting target desired by the user, and based on this prediction determines whether or not an inference model stored in the camera is suitable for shooting the shooting target that has been predicted. If the result of this determination is that the inference model is not suitable for shooting the shooting target, a request to generate an inference model that is appropriate to the shooting target desired by the user is issued to the external unit. The camera may also determine whether or not the inference model is appropriate to shooting at the time of shooting the shooting target. In the event that an inference model is not suitable for shooting, warning display is performed on the display section. Further, an image etc. that has been determined to be inappropriate with the inference model that has been stored in the camera may be stored and made a candidate for requesting generation of an inference model to the external unit.

Also, as inference models, the external unit generates general-purpose inference models (general-purpose dictionaries) that can perform shooting advice for various shooting targets, and individual inference models (individual dictionaries) that can perform shooting advice for shooting targets of a specified range. The company receives general-purpose inference models and individual inference models from the external unit, and stores them in a storage section. When the user uses the camera, advice for shooting is performed using individual inference models that have been stored. Depending on the shooting target there may be cases where an individual inference model is not suitable. In this case, the camera requests generation of an individual inference model that is appropriate to this shooting target, to the external unit. If it is possible to receive an individual inference model from the external unit, shooting advice is performed using this individual inference model. On the other hand, if the camera cannot acquire an individual inference model, shooting advice is performed using a general-purpose inference model that has been stored.

A first embodiment of the present invention will be described using FIG. 1 to FIG. 7. FIG. 1 is a block diagram mainly showing the electrical structure of an imaging system of the first embodiment. This imaging system has a camera 10 and an external unit 20. The camera 10 and the external unit 20 can exchange data etc. by means of a network.

The camera 10 has an imaging section 11, an inference engine 12, a communication section 13, a display section 14, an operation section 15, a storage section 16 and a control section 17. This camera 10 functions as an imaging device that receives inference models from the external unit 20.

The imaging section 11 comprises an optical system 11*a* and an image sensor 11*b*, and besides these components has an imaging control circuit, and an image data processing circuit etc. The imaging section 11 generates image data of a subject, and outputs this image data to the control section 17 and the inference engine 12. The imaging section 11 functions as an image sensor that forms an image of a shooting target desired by the user, and outputs image data. The imaging section 11 also functions as an imaging section that converts a subject to image data.

The inference engine 12 is input with inference models that have been generated by an input output modeling section 24, described later, within the external unit 20, and stores these input inference models in a storage section 12*a* as an inference model for shooting target object A. The inference engine 12 performs inference so as to create shooting advice (advice display and/or automatic control of the camera) such that evaluation becomes high for image data that has been acquired by the imaging section 11, using an inference model that has been stored in the storage section 12*a*. The inference engine 12 has an input layer, intermediate layers, and an output layer, similar to FIG. 2 which will be described later, with strength and weighting of neuron connections between these layers being set in accordance with inference models that have been stored in the storage section 12*a*.

The inference engine that has set the above described inference model will be provisionally called a first inference engine. An inference model of this first inference engine is generated by causing machine learning with data which is the image and associated information based on this image to be conveyed to the user, as training data. With the simplest example, facial images of a person are collected, and where in these images there are eye portions is learned using coordinates. With an inference engine that uses an inference model that has been acquired by this learning it is possible to determine eye portions of a subject at the time of shooting more quickly than the user determining a screen visually. Also, if focusing and exposure control are combined with this inference result, it is possible to provide a camera that can automatically perform shooting with representation of an eye made important. It is possible to also easily provide a product of a specification such that advice relating to shooting with an eye made important is given, by accessing a database that stores advice relating to eyes if an eye is detected.

Also, if it is an inference engine for performing detection of a bird or detection of a flower, the former moves quickly and so the inference engine for a bird scene is convenient, and for the latter color is important and so if image processing so as to detect the color of a flower and make the color vivid is performed, it will be appreciated by the user. Also, depending on the inference engine, professional know-how may be given as advice as to where on a petal to focus, and may be reflected in automatic control.

The inference engine (inference model, dictionary) used is changed for every object that is to be detected within an image, such as "eye", "bird", "flower". Management may therefore be performed by determining a dictionary name that represents what type of input and output relationships the respective dictionaries have (here, input is an image, and output is position of an object that has been detected within a screen and advice information) to be "eye dictionary", "bird dictionary", "flower dictionary", etc.

In the case of memory (storage section) that manages dictionary names loaded in a device, it becomes possible to determine whether or not an inference engine that uses this dictionary is suitable for shooting a shooting target the user wants. Specifically, when shooting a specified shooting physical object with a controller referencing a dictionary name, it is possible to provide a first inference engine that performs inference for the purpose of control of guidance display or automatic control, using an inference model for performing guidance display or automatic control. In a case where it has been determined that there is not a dictionary that is suitable for the shooting instructed by the user, it can be determined that the inference model set in the first inference engine is not suitable for shooting of the shooting target the user desires. There may be a configuration whereby if it has been determined that the inference model is not suitable, a controller requests generation of an inference model that is suitable for a shooting target the user wants to an external learning device.

The storage section 12*a* functions as a memory for storing an inference model for guidance display or automatic control at the time of shooting a shooting target. This memory is capable of storing a plurality of inference models (refer to S7 in FIG. 6A, for example). The memory may further store a general-purpose inference model. The memory stores a give up inference model for a shooting target, in order to infer that it is not possible to perform shooting advice or automatic control (refer to S31 in FIG. 6B and S57 in FIG. 7).

The inference engine 12 functions as an inference engine that performs inference for control of guidance display or automatic control, using an inference model. The inference engine performs inference by selecting an inference model that is appropriate for a shooting target from among a plurality of inference models (refer, for example, to S7 and S9 in FIG. 6A). The inference section performs inference by selecting a general-purpose inference model if it has been determined by a determination section that reliability is low (refer, for example, to S17 in FIG. 6A). Even in a case where it has been determined by a controller (determination section) that an inference model is not appropriate for shooting a shooting target, the inference engine maintains an inference model for a specified period because there may be cases such as the user having not captured an object within the screen (refer, for example, to S11 and S13 in FIG. 6A). In a case such as movement of a physical object being fast, there are sometimes cases where the user has not been able to capture an object within the screen, but if an inference model is maintained for a specified period of time it is possible to perform inference again with the same inference model when the user captures an object within the screen.

Figure 7:
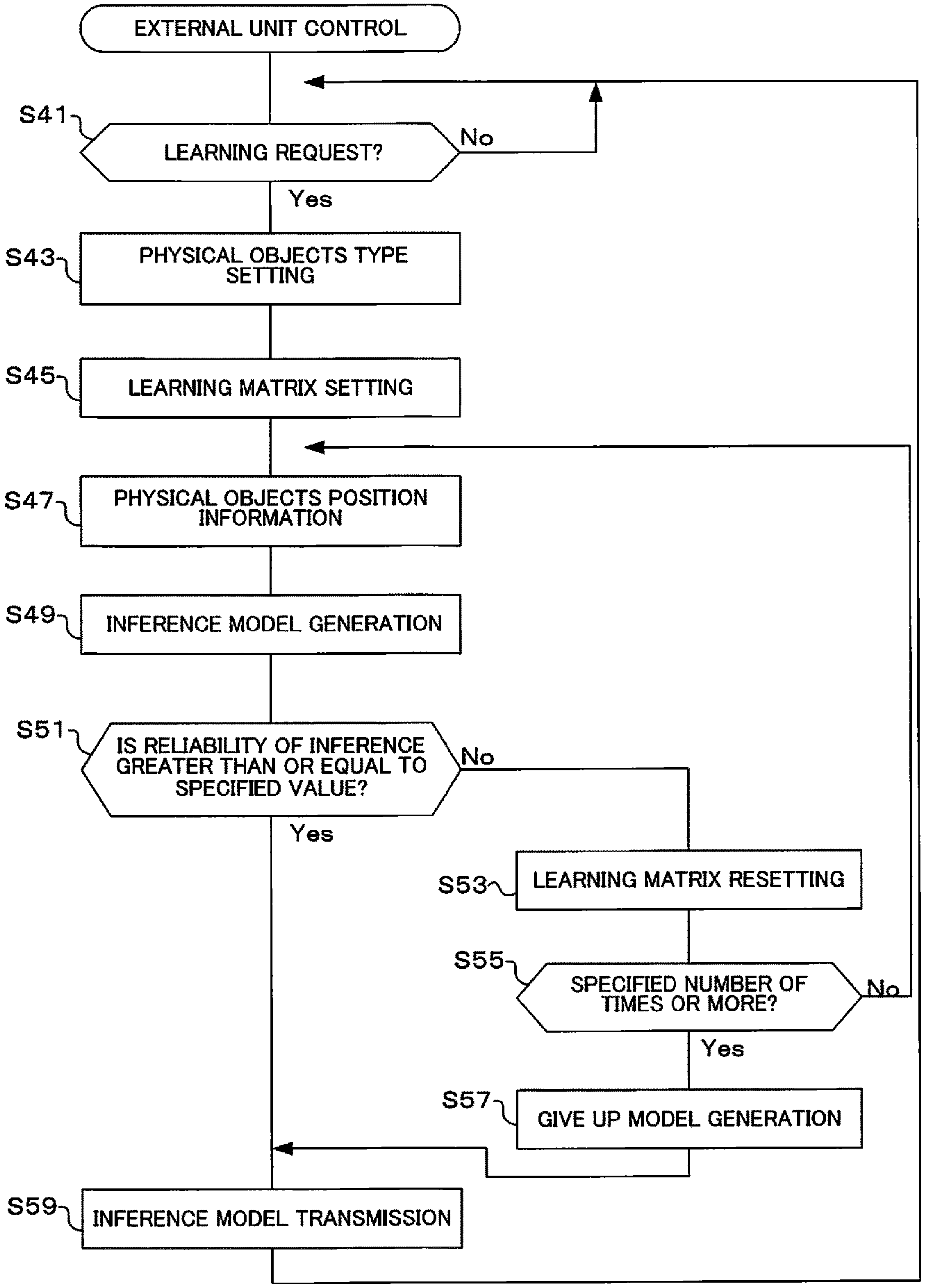
FIG. 7 is a flowchart showing operation of an external unit of the imaging system of the first embodiment of the present invention.
Figure 8:
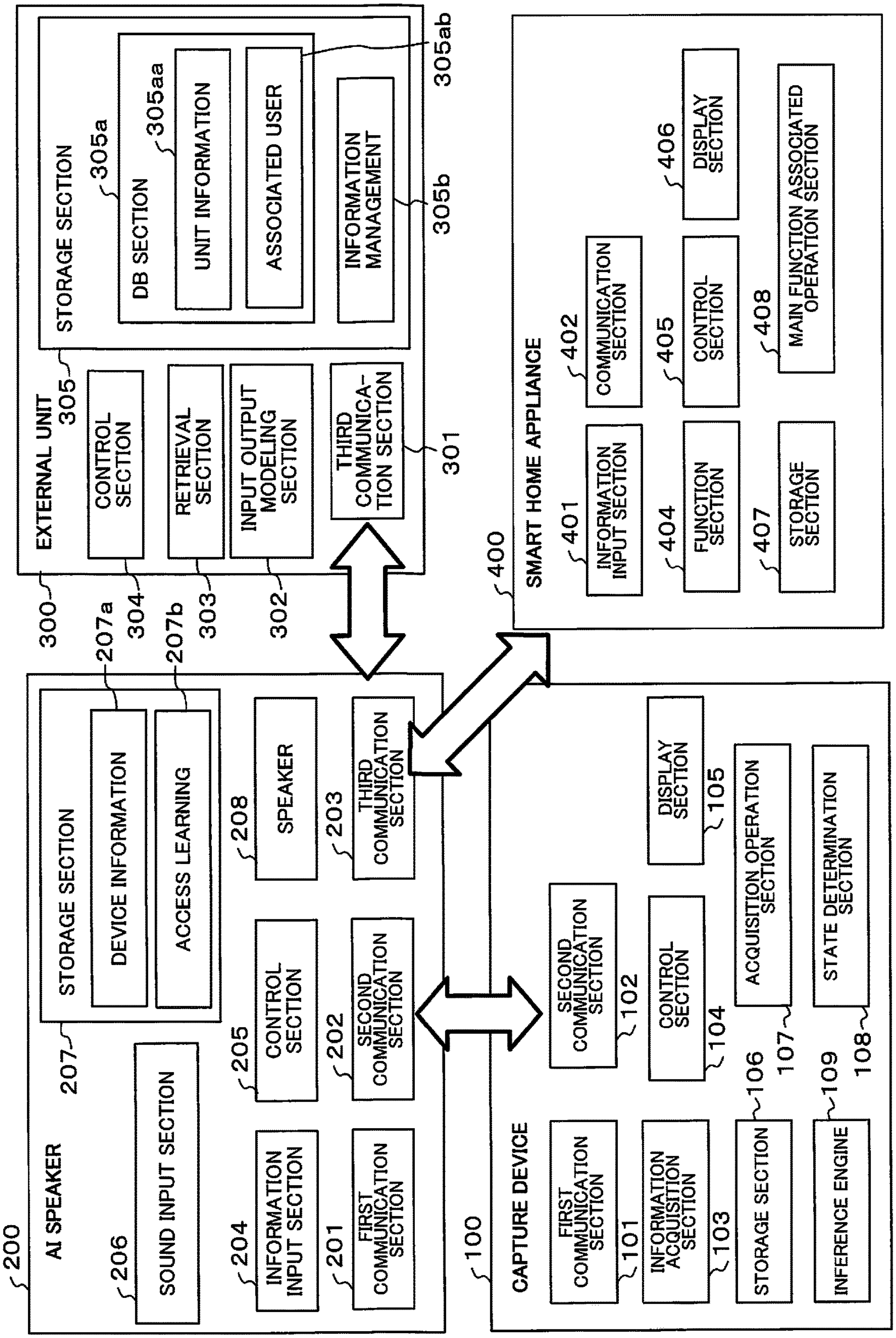
FIG. 8 is a block diagram mainly showing the electrical structure of an imaging system of a second embodiment of the present invention.

Also, the inference engine has a second inference engine for determining whether or not an inference model is appropriate for shooting a shooting target that has been predicted, and this performs inference using a second inference model (refer, for example, to the give up model of S57 in FIG. 7). The second inference model results from having performed learning, when creating an inference model, by collecting, from among training data, training data that did not obtain a reliability of a specified level or higher, as training data (refer, for example, to S57 in FIG. 7). Specifically, with shooting opportunities under various conditions, it is possible to collect images the user wants to delete when using an inference model, or at the time of creating an inference model, to collect images that did not acquire a reliability of a specified level or higher, from among training data, as training data, and to use results of learning as a second inference model. It can be determined whether or not this second inference model is suitable for shooting a shooting target that has been predicted.

In this case, image data that has not obtained reliability, and image data that is wrong even though reliability is high, etc., are made training data, and learning is performed by appending annotation to the effect that these training data are likely to be wrong. If the results (inference model) of this learning are set in an inference engine that is currently in operation, a second inference engine is obtained that can determine (infer) that a scene one in which it is difficult to determine an assumed physical object using the first inference engine.

There is a high possibility that this inference engine for poor determination (second inference engine) will be wrong with respect to images determined as poor, and so determination results may be reevaluated by a physical object determination inference engine. As reevaluation of determination, there is, for example, prohibiting display based on inference results. Also, it is possible for a physical object determination inference engine to not perform determination for images that have been determined to be poor. Further, a current first inference engine may be rewritten to one that has been relearned with failed scenes collected and used as training data.

Also, by performing inference using an inference engine for weak determination (second inference engine), it is possible to determine whether at least a currently being taken object is an object that the first inference engine is weak at determining. For a user shooting many scenes like this for which it has been determined that the second inference engine is weak, an inference engine within the device should be learned again, and/or the inference engine rewritten. For cases where only scenes for which reliability of inference results by the first inference engine is low have been taken also, a new first engine may be acquired and/or first inference engine may be learned again.

As has been described above, when shooting a specified shooting physical object, a first inference engine is possible that performs inference for the purpose of control of guidance display or automatic control, using an inference model for performing guidance display or automatic control. Whether or not this inference model is suitable for shooting a specified shooting target may be determined by comparing a number of times shooting has been performed where it has been determined that reliability of inference results with the current first inference engine is low (or, alternatively, since there are also cases where shooting is not performed because inference reliability is low, counting the number of times shooting preparation is performed) with a specified threshold value, or by comparing a proportion of such inference results with a specified threshold value. Alternatively, a number of times of shooting where there are many weak determinations with a second inference engine (or, alternatively, a number of times shooting preparation is performed) may be determined by comparing with a specified threshold value, or comparing a proportion of shooting where it has been determined that reliability is low with a specified threshold value. If the result of this determination is that an inference model is not suitable for shooting a specified target object, relearning is performed, and a new engine may be obtained.

As has been described above, there is a possibility that a first inference model that is currently being used (operated) will be determined as being not suitable for shooting a shooting target the user wants. There may be a configuration whereby if it has been determined that the inference model is not suitable, a controller of a camera requests generation of an inference model that is suitable for a shooting target the user wants (including new learning, re-learning) to an external learning device. It should be noted that new learning is learning by reforming training data, and that re-learning is learning by adding new data to the training data.

Figure 6A:
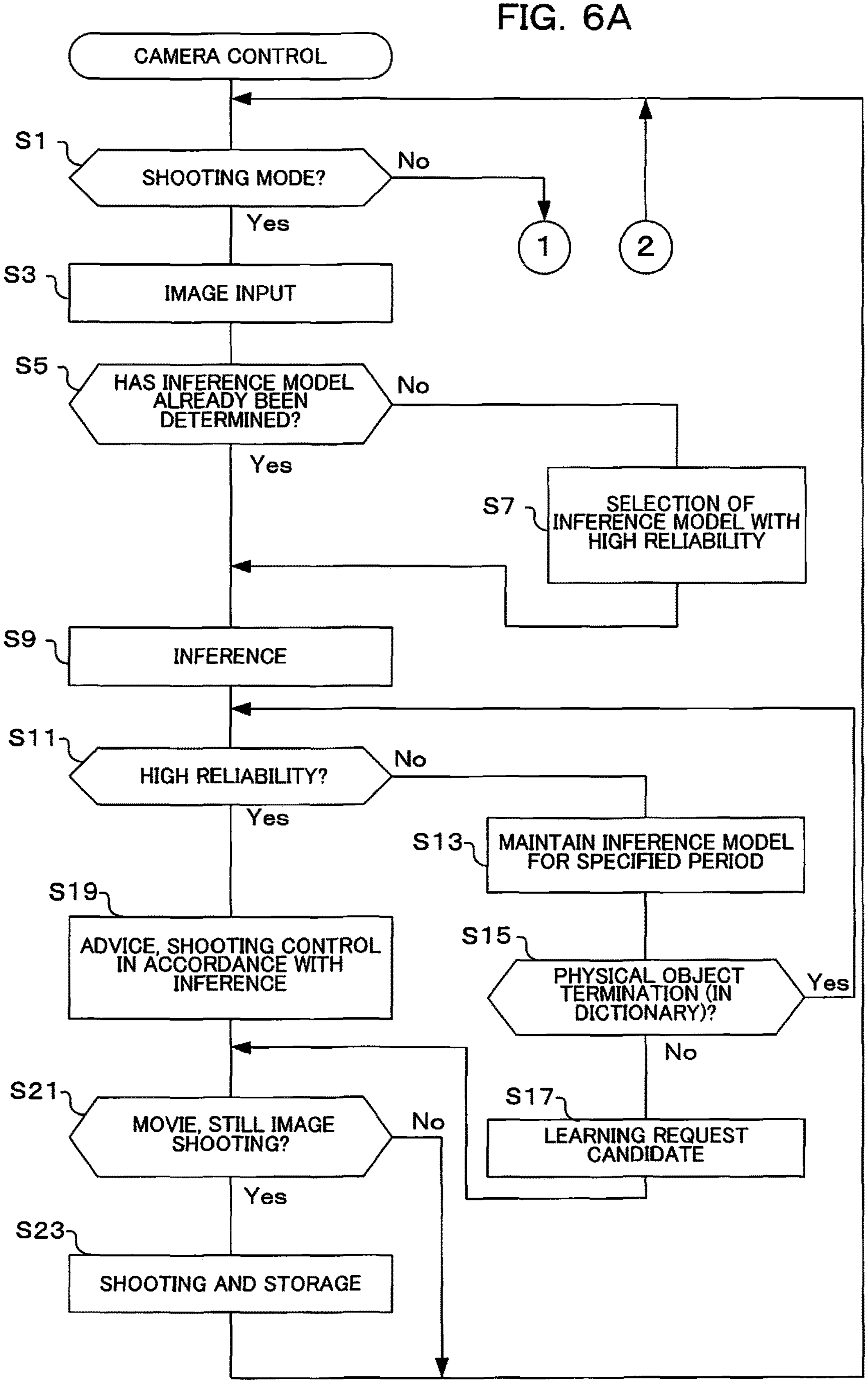
FIG. 6A and FIG. 6B are flowcharts showing operation of a camera of the imaging system of the first embodiment of the present invention.

Also, the inference engine performs inference as to whether or not it is possible to perform guidance display or automatic control, using a give up inference model (refer, for example, to S9 in FIG. 6A). Obviously, even if a give up inference model is not used, in cases such as many shooting scenes as described in the following, it is possible to determine that an inference model that has been stored in the camera 10 is not an inference model that is suitable for the user. There may be cases where reliability of object determination with an inference model repeatedly remains low, and cases where a tendency for reliability to improve from a low value is not seen, or reliability becomes lower. In a case where there is absolutely no improvement in reliability, even with change in shooting scene, it can be considered to be an inference model that is not suitable for this user.

For example, with an inference model that outputs guidance for detecting flowers or shooting birds, there are few flowers in winter and the opportunity to shoot flowers is also reduced, and there will be few opportunities to perform “flower determination” and “guidance for shooting flowers” etc., even if this inference model is used. However, once spring returns the above described inference model once again becomes an effective inference model. Accordingly, it is impossible to say that the above described inference model is inadequate for that user. Also, an inference model that is suitable for shooting flowers is inappropriate in shooting environments and conditions where people are the main subjects, such as weddings. Nevertheless, it can also be expected that there may be a user who will shoot birds and flowers at a wedding, and it is impossible to say that this inference model will be unsuitable for that user. However, when an inference model does not yield high reliability results in any seasons, or anywhere shooting is carried out, or in any shooting situations or under any shooting conditions, it is possible to arrive at a determination that another inference model is necessary for this user. In a case where an imaging device performs imaging under different conditions (for example, different seasons, different time and date, different place, different user, different inference model usage period) and an inference engine 12 has performed inference using results of this imaging, it may be inferred whether or not the inference model that was used is suitable for shooting a shooting target that has been predicted only if there is no improvement in reliability of inference results under any of these conditions.

The communication section 13 has a communication circuit (including a transmission circuit and a reception circuit), and performs wireless or wired communication with a communication section 22 within the external unit 20, by means of the Internet or the like. This communication section 13 transmits a learning request that has been set by the user using the operation section 15 to the learning section 21 (refer, for example, to S29 in FIG. 6B, and S67 in FIG. 9). This communication section 13 receives an inference model that has been generated by an input output modeling section 24 (refer, for example, to S31 in FIG. 6B, S59 in FIG. 7, and S71 in FIG. 9). The communication section 13 functions as a transmission circuit that transmits learning requests that have been set by a setting control section 2 the learning device (refer to S29 in FIG. 6B, etc.). The communication section 13 functions as a reception circuit that receives inference models that have been generated by the learning device, based on an image database and learning demands (refer, for example, to S31 in FIG. 6B, and to S71 in FIG. 9).

It should be noted that in a case where the camera 10 cannot directly access the external unit 20, the camera may communicate with the external unit 20 by means of a portable communication device etc. such as a smartphone. Also, in the event that the camera 10 itself is incorporated into a portable communication device such as a smartphone, the camera may communicate with the external unit 20 by means of this portable communication device.

The display section 14 has a display such as a display panel or the like, and performs display of a through image (also called "live view image") etc. based on image data that has been acquired in the imaging section 11. The display section 14 also performs display of inference results of the inference engine 12. The display section 14 also displays learning demands (requests) that have been set using the operation section 15 (refer to FIG. 4A, for example).

The display section 14 functions as a display section that displays inference results that have been performed using an inference model (refer, for example, to S19 in FIG. 6A). Also, when performing through image display, inference results are displayed (refer, for example, to S19 in FIG. 6A). Also, the display section 14 performs warning display when it is not possible to perform shooting guidance etc. of high reliability, with an individual inference model (individual dictionary) that is stored in the camera 10 (refer, for example, to FIG. 4C, and to S17 in FIG. 6A). The display section 14 also functions as a display that displays a through image based on image data (refer, for example, to S3 in FIG. 6A). At the time of shooting a shooting target a warning is displayed on a display by a controller (determination section), in the event that it has been determined, using an inference model, to not be appropriate for performing good shooting for a shooting target desired by the user (refer, for example, to FIG. 3, FIG. 4C, and S11 and S17 in FIG. 6A).

The operation section 15 is an interface for inputting user commands to the camera 10, has various operation members such as a power switch, release button, movie button, mode setting dial, cross-shaped button, OK button etc., detects operating states of the operating members, and outputs the operating states to the control section 17. Also, the operation section 15 may also have a touch panel that detects a touch operation on a display screen of the display section 14. Further, it is possible for the operation section 15 to perform text input. A learning request that has been set using the operation section 15 is transmitted to the learning section 21, and the learning section 21 performs learning (refer to S29 in FIG. 6B).

The storage section 16 has an electrically rewritable nonvolatile memory, and stores image data. Specifically, since an image processing section 17*b* has applied image processing for storage to image data that has been acquired by the imaging section 11, the image data that has been subjected to this image processing is stored in nonvolatile memory.

The control section 17 is a controller comprising one or two or more processors, and has a CPU (Central Processing Unit), peripheral circuits and a memory etc., and the CPU performs control of each section within the camera 10 in accordance with a program that has been stored in memory. The control section 17 comprises a parameter control section 17*a*, an image processing section 17*b*, a storage control section 17*c*, a setting control section 17*e*, and a communication control section 17*f*.

The control section 17 functions as a controller (determination section) that determines whether or not an inference model is suitable for shooting a shooting target (refer, for example, to S11 in FIG. 6A). In the event that it has been determined as a result of the above described determination that an inference model is not suitable for shooting a shooting target that is desired by the user, the controller requests generation of inference model that is suitable for a shooting target the user desires to an external learning device (refer, for example, to S11, S17 and S29 in FIG. 6A). Regarding whether or not the inference model is suitable for shooting of the shooting target, the controller compares a value representing operating state of a specified inference model that is usable, or a confidence value of an inference result at the time of operation of the specified inference model, with a specified value, and determines whether or not the inference model is suitable for shooting a shooting subject intended by the user based on the result of this comparison. As a value representing operation information of the specified inference model that is usable, a number of times that shooting was actually performed with inference being performed using the inference model, may be used, or a number of times that inference was performed at the time of a shooting preparation operation may be used. Also, a value representing reliability of inference results for the inference model (for example, a LOSS value) may be compared with a specified value, and low reliability determined when the value representing reliability is lower than the specified value.

The controller (determination section) calculates reliability for inference that is performed by an inference engine, and if this reliability is higher than a specified value determines that inference to be suitable for shooting of a shooting target (refer, for example to S11 in FIG. 6A).

Also, in a case where the imaging device performs imaging under different conditions, and there is no improvement in reliability using the inference model under any conditions when inference has been performed with an inference model using the results of this imaging, the controller (determination section) determines whether or not the inference model is suitable for shooting a shooting target that has been predicted to be shot by the user. The above described imaging under "different conditions" means imaging, for example, in different seasons, at different times and dates, in different places, with different users, and with different usage periods after having stored an inference model. This determination may be a determination as to whether or not an inference model is suitable for shooting a shooting target, in the event that it has been determined in step S11 in FIG. 6A, which will be described later, that reliability has not improved. It should be noted that this determination is not limited to being performed by the control section 17, and may be performed by the inference engine 12. In the event that the above described "different usage periods" is that a usage period after commencing use of an inference model is short, determination as to whether or not an inference model is suitable for shooting of a shooting target would be premature.

Figure 6B:
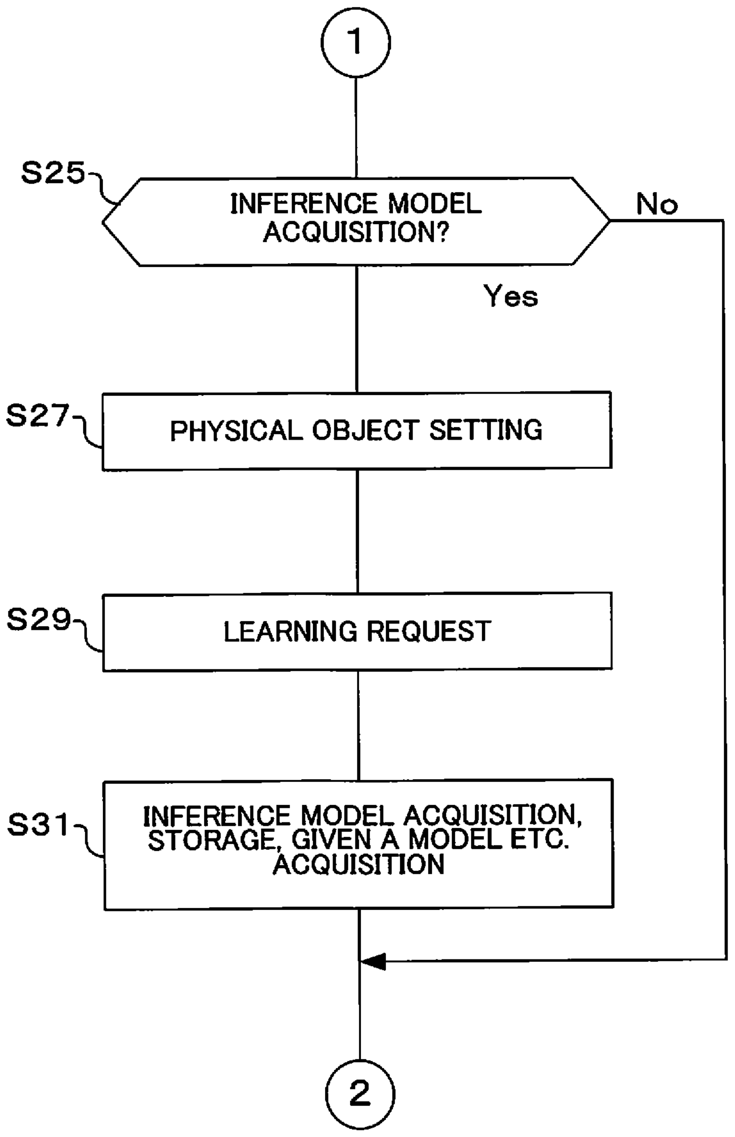

Also, in a case where it has been determined that the inference model is not suitable for shooting a shooting target the user wants, when requesting generation of an inference model that is suitable for a shooting target the user wants to an external learning device, the controller (determination section) requests generation of the inference model to the external device after acquiring user permission (refer, for example, to S29 in FIG. 6B). In this case, the fact that an inference model will be generated is displayed on the display section 14, and if the user does not give consent, requesting generation of an inference model to the learning device should be prohibited. In this way it is possible to prevent rewriting of inference model without the user's knowledge.

The parameter control section 17*a* controls various parameters within the camera 10. As parameters there are parameters for exposure control (aperture value, shutter speed value, ISO sensitivity etc.), parameters for focal length (zooming) adjustment, and parameters for focus position adjustment, etc. Also, parameters are not limited to those for shooting control, and may also be parameters for image processing, such as art filters.

The image processing section 17*b* has an image processing circuit, and performs image processing for through image display, image processing for storage, and image processing for playback of stored images etc. The storage control section 17*c* has a storage control circuit, and performs storage control for storing image data in the storage section 16.

A setting control section 17*d* controls settings of a learning demand (request) for the purpose of learning in the learning section 21. If the user inputs a learning demand (request) using the operation section 15, this learning demand is transmitted to the learning section 21 by means of the communication section 13 and the communication section 22. The learning section 21 performs deep learning (although this is not limited to deep learning and may be machine learning), and if an inference model is generated this inference model is received by means of the communication section 22 and the communication section 13 and stored in the storage section 12*a* of the inference engine 12. The setting control section 17*d* functions as a controller (setting control section) that sets requirements for generating an inference model. The controller (setting control section) sets requirements by designating at least one of shooting target classification and position information (refer, for example, to S43 and S47 in FIG. 7).

A communication control section 17*e* has a communication control circuit, and performs communication control when the communication section 13 communicates with the learning section 21. The communication control section 17*e* functions as a communication control section that, when it has been determined by a determination section that an inference model is not suitable for shooting a shooting target that the user wants, externally transmits a generation request for an inference model that is suitable for a shooting target. The communication control section transmits requirements, that have been set by the setting control section, to the outside (refer, for example, to S29 in FIG. 6B). The communication control section transmits an inference model generation request together with these requirements that have been set.

Figure 3:
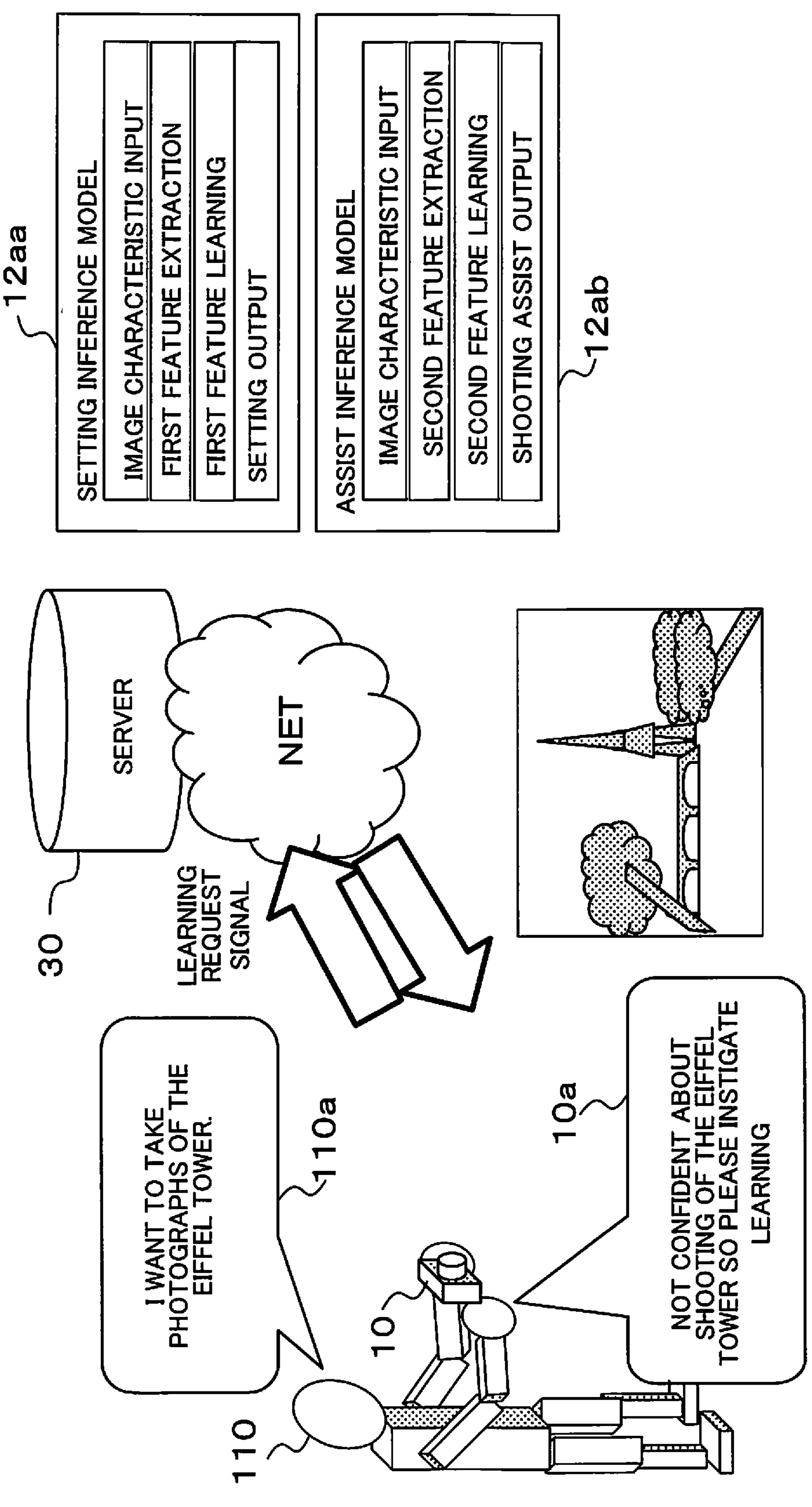
FIG. 3 is a drawing showing usage states of a camera of the imaging system of the first embodiment of the present invention.

The external unit 20 has a learning section 21 and an external image database (DB) 27. The learning section 21 and the external image DB 27 may be arranged within the same unit, or may not be arranged inside the same unit. The learning section 21 and the external image DB 27 are preferably capable of cooperating with each other by means of communication. Also, a plurality of external image DBs 27 may be provided, and it is preferably possible for the communication section 22 and the communication section 28 to communicate with the plurality of external image DBs to access image data, and acquire information relating to image data from the learning section 21. In FIG. 3, which will be described later, the external unit 20 is arranged within a server 30, and can be connected to the camera 10 via the Internet.

The learning section 21 has the communication section 22, a population creation section 23, input output modeling section 24, output setting section 25, and control section 26.

The communication section 22 has a communication circuit (has a reception circuit and/or a transmission circuit), and performs transmission and reception of data with the communication section 28 of the external image DB 27. The communication section 22 also performs transmission and reception of data with the communication section 13 of the camera 10. The communication section 22 functions as a reception circuit that receives learning demands (requests) indicating photographs intended by the user from the imaging device (refer, for example, to S41 in FIG. 7). The communication section 22 also functions as a transmission circuit that transmits inference models that have been output from the machine learning processor to the imaging device (refer, for example, to S59 in FIG. 7).

The population creation section 23 creates an image data population for performing deep learning. All image data may be used as is as an optimum population. However, if the population is too large time will be required for processing. Also, if the population is too large there may be cases where there is overfitting and reliability is lowered. It is therefore preferable to extract a population of a suitable size from all image data using information that can be transmitted as accompanying information of the image data.

Figure 2:
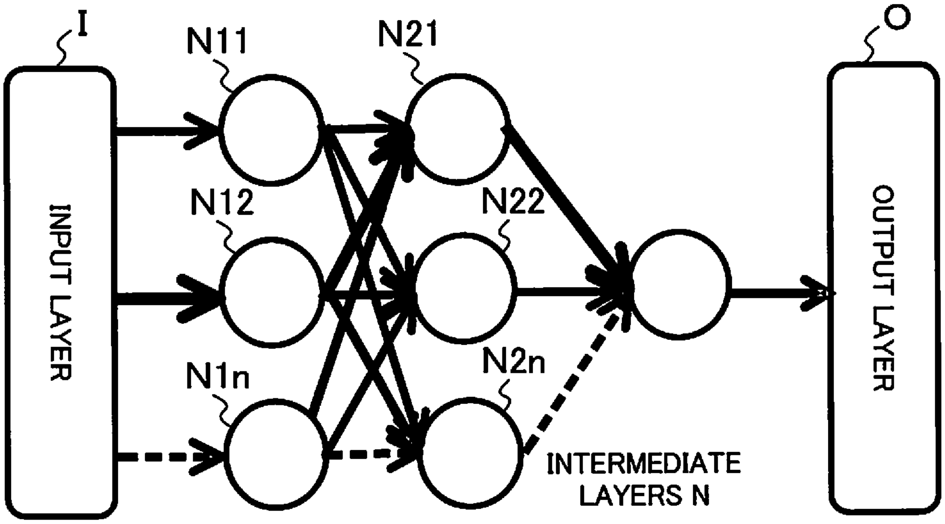
FIG. 2 is a block diagram showing a configuration for inference model formation in a learning system of the first embodiment of the present invention.

The input output modeling section 24 has a machine learning processor, and performs deep learning (machine learning) using so-called artificial intelligence (AI). Specifically, using an image data population that has been generated by the population creation section 23, the input output modeling section 24 generates a general-purpose inference model or an individual inference model, by deep learning. The input output modeling section 24 has a configuration such as shown in FIG. 2. An input layer I is input with image data that has been created by the population creation section 23. Also, image evaluation results, for example, training data (correct solution) are supplied to an output layer O. An inference model is generated by calculating strength (weight) of connection between each neuron N11 to N2*n*, so that the input and output match.

Also, the input output modeling section 24 functions as a machine learning processor that extracts an image that satisfies a learning demand that has been transmitted from the camera 10, and for which a number of evaluations from a third party is greater than a specified value, from the image database, performs machine learning (including deep learning) using this extracted image, and outputs an inference model (machine learning processor for learning result generation that is input with learning data and learning parameters of a neural network or the like, and performs machine learning by various methods) (refer, for example, to S49 in FIG. 7).

The output setting section 25 sets shooting advice that is used at the time of performing inference, and/or shooting parameters, using an inference model that has been generated by the input output modeling section 24. Specifically, the camera 10 displays shooting advice for a shooting target in order to shoot a photograph so that it will receive evaluation from a third party, based on inference results of the inference engine 12. The output setting section 25 generates and sets shooting advice used at this time. Also, the camera 10 automatically sets shooting parameters etc. for a shooting target in the inference engine 12 so as to take a photograph that will receive evaluation from a third party. The output setting section 25 generates and sets shooting parameters used at this time.

The control section 26 is a controller comprising one or two or more processors, and has a CPU (Central Processing Unit), peripheral circuits and a memory etc., and the CPU controls each section within the learning section 21 in accordance with a program that has been stored in memory.

It should be noted that some or all of the peripheral circuits of the CPU within the control sections 17 and 26 may be implemented using a CPU (Central Processing Unit) and program code, may be implemented by circuits that are executed by program code such as a DSP (Digital Signal Processor), may use a hardware structure such as gate circuits that have been generated based on a programming language described using Verilog, or may be executed using hardware circuits. Also, some functions of the CPU may be implemented by circuits that are executed by program code such as a DSP, may use a hardware structure such as gate circuits that are generated based on a programming language described using Verilog, or may be executed using hardware circuits.

The external image DB 27 has a communication section 28 and an image classifying section 29. The external image DB 27 can be accessed by a third party, and if a third party likes an image that has been accessed, the fact that a third party preference has been met is expressed as a gesture, such as "that's nice". This gesture is stored in the external image database in association with the image that has been evaluated, by means of a network, and published by means of the network. Also, if an image has been evaluated, the evaluation may be stored in association with the image, without being limited to the "that's nice" display. The communication section 28 has a communication circuit and performs exchange of data with the communication section 22 of the learning section 21.

The image classifying section 29 performs image classification for image data stored within the external image DB 27, or stored in an image DB that is external to the external image DB 27. Specifically, there is classification for every shooting physical object, and storage in the database for every classified image. Storage of two types of image groups, namely a physical object type A image group 29*a* and a physical object type B image group 29*b*, is shown in FIG. 1. However, the two images groups are not limiting, and classification may be performed into three image groups or more, and storage performed for each image group.

Next, the structure of the input output modeling section 24 that performs deep learning, and the inference engine 12 that performs inference using an inference model, will be described using FIG. 2. This input output modeling section 24 has intermediate layers (neurons) arranged between an input layer I and an output layer O. As these intermediate layers, a number of neurons N11 to NN1*n*, N21 to N2*n*, . . . , are arranged. The number of neuron layers is appropriately determined according to the design, and a number of neurons in each layer is also determined appropriately in accordance with the design.

Follow images are input to the input layer I, and training data (correct solution) is provided to the output layer O. When image data has been input to the input layer I, strengths (weights) between each of the neurons are determined by respective learning such that training data (correct solution) is output from the output layer O. As an inference model, each neuron, and strength (weight) of connection between each neuron, that have been obtained by learning, are output.

The inference engine 12 has the same structure as FIG. 2, and an inference model that has been created by the input output modeling section 24 (strengths (weights) of connections between neurons) is set in an intermediate layer. Therefore, if the image data that has been acquired by the imaging section 11 is input to the input layer I, it is possible to obtain output such as shooting guidance from the output layer O.

Next, advice etc. that uses the inference model of this imaging system will be described using FIG. 3 to FIG. 5B.

It will be assumed that the user 110 wishes to shoot the Eiffel Tower using the camera 10, as shown in FIG. 3. A setting inference model 12*aa* for action guidance and an assist inference model 12*ab* for shooting advice are stored in the storage section 12*a* within the inference engine 12 of the camera 10. The setting inference model 12*aa* stores an inference model (dictionary) for assisting actions of the user when performing shooting. The setting inference model 12*aa* can perform inference for assisting actions of the photographer, for example, in such a case as when shooting the Eiffel Tower, that is appropriate for inferring what shooting location should be moved to etc., in order to shoot a photograph that will receive evaluation from a third party.

Also, the assist inference model 12*ab* stores an inference model (dictionary) for performing shooting guidance when the user performs shooting. The assist inference model 12*ab* stores exposure control values (aperture value, shutter speed value, ISO sensitivity), focal length (zooming), focus position etc. for shooting a photograph in order to receive evaluation from a third party. The assist inference model is not limited to storing exposure control values, and may also store an inference model for performing shooting guidance relating to composition. Shooting guidance relating to composition, for example, to cause inclination of the photographing lens of the camera to be moved slightly left, right, up, or down, etc., is instructed to the user.

The setting inference model 12*aa* stores image characteristic input, first feature extraction, and setting output, while the assist inference model 12*ab* stores image characteristic input, second feature learning, and shooting assist output. These inference models (dictionaries) correspond to learning the models that were shown in FIG. 2. The first image characteristic input is characteristics of an image that has been input to the input layer I. The first feature extraction is information such as position, brightness, color etc. of a pixel that has been extracted from within the image data that has been input to the input layer I. The first feature learning is strength (weights) of connections between each neuron. The setting output stores results of deep learning. It should be noted that in this embodiment, inference models are separated into "setting inference models" and an "assist inference models". However, this is not limiting, and both inference models may be integrated, and further, functions may be divided to three or more inference models.

The setting inference model 12*aa* and the assist inference model 12*ab* respectively have a general-purpose inference model and an individual inference model. An individual inference model is an inference model (dictionary) based on learning results that have been performed for every individual shooting target, such as, for example, an inference model for shooting the Eiffel Tower, an inference model for shooting Tokyo Tower, an inference model for shooting dogs, an inference model for shooting birds, an inference model for shooting scenery, etc.

As was described previously, it is considered that the user 110 wishes to shoot the Eiffel Tower. In actual fact, before visiting Paris setting of a shooting target is performed in the operation section 15 of the camera 10 (refer to reference numeral 110*a* in FIG. 3). Also, in a case where there is a sound input section, such as a microphone, and a speech recognition section in the camera 10, it is possible to perform setting of the shooting target using sound. However, there may be cases where an individual inference model that is appropriate for when shooting the Eiffel Tower is not stored in the setting inference model **12*aa* or the assist inference model 12*ab* of the camera 10. At this time, since an inference model for taking a photograph of the Eiffel Tower is not stored, the camera 10 performs warning display indicating this fact. With the example shown in FIG. 3, "Since we are not confident of shooting the Eiffel Tower, please perform learning." is displayed (refer to reference numeral 10*a* in FIG. 3**).

The user 110 then transmits a learning request so as to create an inference model that is suitable for shooting the Eiffel Tower to the learning section 21 within the server 30 (refer to S29 in FIG. 6B). It should be noted that even if the user 110 issues a learning request to the learning section 21, there may be cases where a considerable time is taken until an individual inference model based on learning results is received. In this case, the user may also await receipt of an individual inference model that has been newly created. Until that individual inference model is received, action guidance and/or shooting guidance may be performed using a general-purpose inference model (general-purpose inference dictionary) that is stored in the storage section **12*a* within the inference engine 12**. Also, in a case where the time taken to generate the individual inference model is considerably long, level of learning (reliability level) may be lowered so as to generate the individual inference model in a short time.

There may be cases where if a shooting target disappears from the screen due to the user changing the composition etc., it is for a short time, but an individual inference model that has been stored in the camera 10 still cannot appropriately perform shooting guidance etc. During this short time (corresponding to the "specified period" in S13 of FIG. 6A), that individual inference model is awaited. If this short time has elapsed and a shooting target once again returns into the screen, the camera 10 can immediately perform inference using the individual inference model and perform shooting guidance etc. In a case where it is not possible to appropriately display shooting guidance etc. even after the specified period has elapsed, there is a possibility that the individual inference model that is stored in the camera does not conform to the shooting style of the user. The image at that time and accompanying information of that image may be made reference information of a learning request (refer to S13 to S17 in FIG. 6A).

Also, since an individual inference model is more fit for purpose with respect to a shooting target than a general-purpose inference model, it is possible to perform precise shooting guidance etc. However, there are cases where it is not possible to perform shooting guidance using an individual inference model, and in that case shooting guidance etc. is performed using a general-purpose inference model. In this case a give up model, which will be described later, is generated (refer to S57 in FIG. 7) and reliability of an individual inference model stored in the camera may be displayed. Specifically, a taken scene is determined, and reliability of the individual inference model is displayed. For example, display may be performed, such as reliability of an inference model for birds is 40%, or reliability of an inference model for scenery is 40%.

Display of the fact that an inference model is inappropriate is possible for each individual shooting. However, display may be performed taking into consideration a plurality of shooting targets that the user is attempting to shoot. For example, in a case where scenery is photographed only once, and after that the user is occupied with the shooting of birds, there may be cases where there is no problem even if reliability for the scenery is low.

In this case, the imaging device should have memory such as described in the following, an inference engine, and a controller. The above-described memory stores inference models for performing guidance display or automatic control, when shooting. Also, the inference engine performs inference for control of the guidance display or automatic control, using the inference model. The controller counts a number of times shooting is performed or a number of times shooting preparation is performed, detects a percentage and frequency of occurrence of cases where reliability of output of the inference engine is lower than a specified value, and determines whether or not the inference model is suitable for shooting a shooting target that the user wants based on the results of that detection. If the result of this determination is that it is been determined that the inference model is not suitable for shooting, generation of an inference model that is suitable for a shooting target the user wants is requested to an external learning device.

A what proportion there is of high reliability results of the inference engine is called effective utilization ratio. If effective utilization ratio is low, relearning should be requested, but besides this method, as was described previously, there is also a method of using a give up model (inference model for poor determination, second inference model). Further, in order to generate information for inducing a learning request, a determination may be carried out, for example, for a category of a photograph (for example, the Eiffel Tower in FIG. 3) that is input by the user's voice or a manual input operation such as a touch operation, by verifying whether or not there is an inference model that conforms to that category in an inference engine that is installed in the camera. Therefore, a name of the inference engine, their purpose of use and a list of applicable physical objects, are stored in memory, and if there is an inference engine that meets the user's needs that inference engine is used, while if there is not an adaptable inference engine a new inference model should be obtained or the current inference model should be relearned. This can be expressed as "relearning" since it can be said that a camera is learning, including a case where as new inference model is obtained.

To perform the operations such as described above, the imaging device should comprise memory, an inference engine, and a controller, as described in the following. The above-described memory stores inference models for performing guidance display or automatic control, when shooting. The inference engine performs inference for control of the guidance display or automatic control, using the inference model. The controller determines whether or not the inference model is suitable for shooting the shooting target, namely, whether or not there is an inference model (dictionary) that is suitable for a shooting target that has been specified by the user. If the result of this determination is that there is not an inference model that is suitable, generation of an inference model that is suitable for a shooting target the user wants is requested to an external learning device.

A value representing operating (usage) conditions for a specified inference model that is usable, and already installed in the camera, or a confidence value for inference at the time of operation of the specified inference model, is compared with a specified value. It is then determined, based on the result of this comparison, whether or not the inference model is suitable for shooting a shooting target that the user wants, and if it is determined that the inference model is not suitable for shooting, generation of an inference model that is suitable for a shooting target the user wants is requested by the controller to the external learning device. In this way, it is possible to provide an imaging device that can facilitate guidance and control conformed to the user's needs.

FIG. 4A to FIG. 4C, FIG. 5A and FIG. 5B show a case of performing shooting of the Eiffel tower when an inference model that is suitable for shooting birds is stored in the camera 10 as an inference model.

Figure 4A:
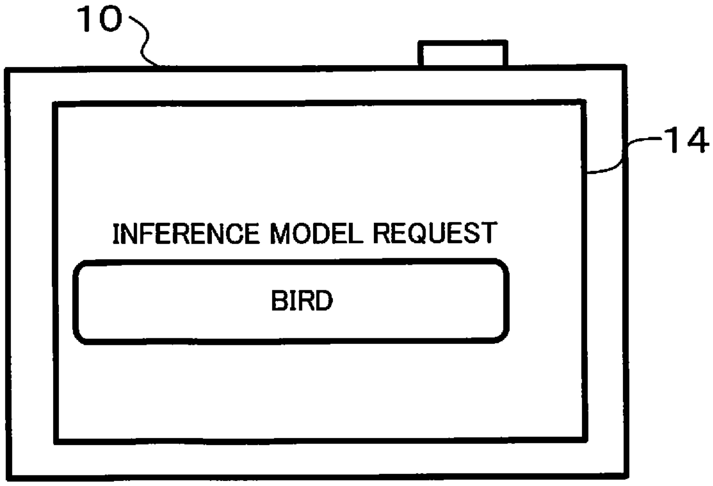
FIG. 4A to FIG. 4C are drawings showing display of a camera of an imaging system of one embodiment of the present invention.

First, FIG. 4A shows appearance of the user requesting an optimum inference model for shooting birds, as an individual inference model. The user operates the operation section 15 and sets "bird" as an inference model. FIG. 4A shows display on the display section 14 at this time. If an inference model for "bird" has been set, the setting control section 17*d* requests generation of an inference model for "bird" to the input output modeling section 24 within the learning section 21, by means of the communication section 13 and the communication section 22 (refer, for example, to S27 and S29 in FIG. 6B). The input output modeling section 24 generates an optimum inference model for shooting birds (inference model for birds, dictionary) using deep learning (refer, for example, to S49 in FIG. 7). If an inference model has been generated, the output setting section 25 generates and sets output such as shooting advice and shooting parameters.

Figure 4B:
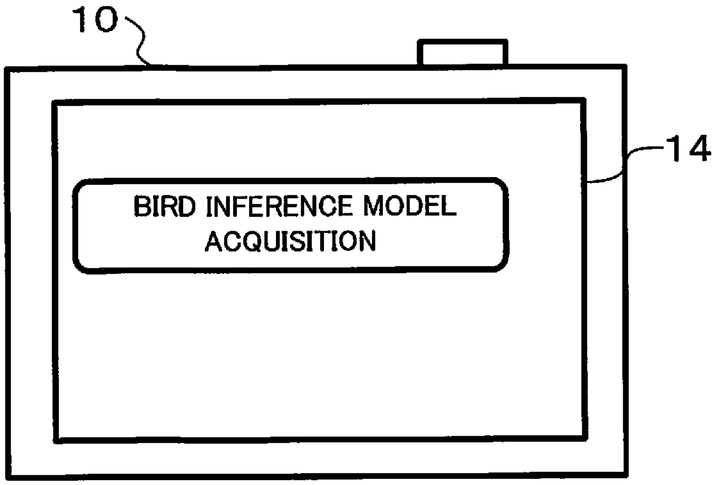

If an inference model for birds has been set in the output setting section 25, the camera 10 acquires the inference model for birds by means of the communication section 22 and the communication section 13 (refer to S31 in FIG. 6B). Once the camera 10 has acquired the inference model for birds, the camera displays the fact that an inference model for birds has been acquired on the display section 14, as shown in FIG. 4B.

Figure 5B:
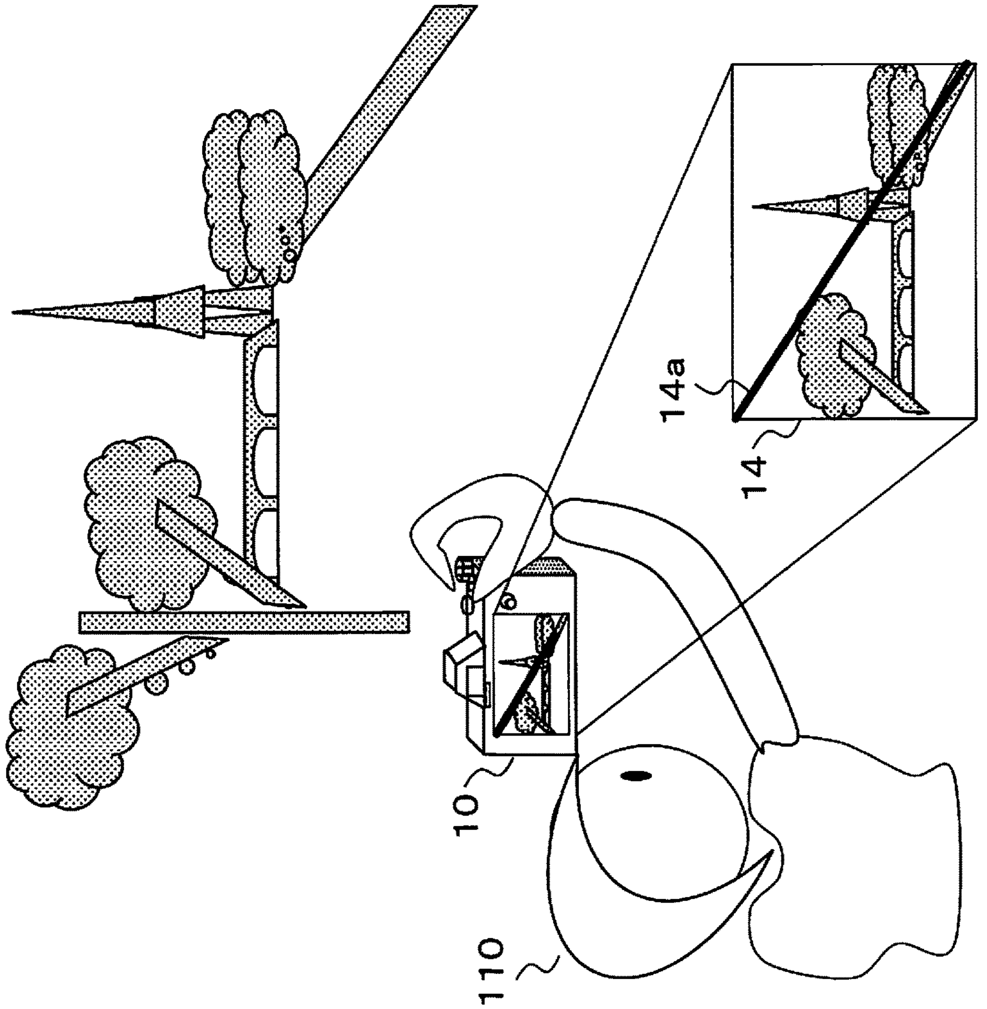
FIG. 5A and FIG. 5B are drawings showing usage states of a camera of the imaging system of the first embodiment of the present invention.
Figure 5A:
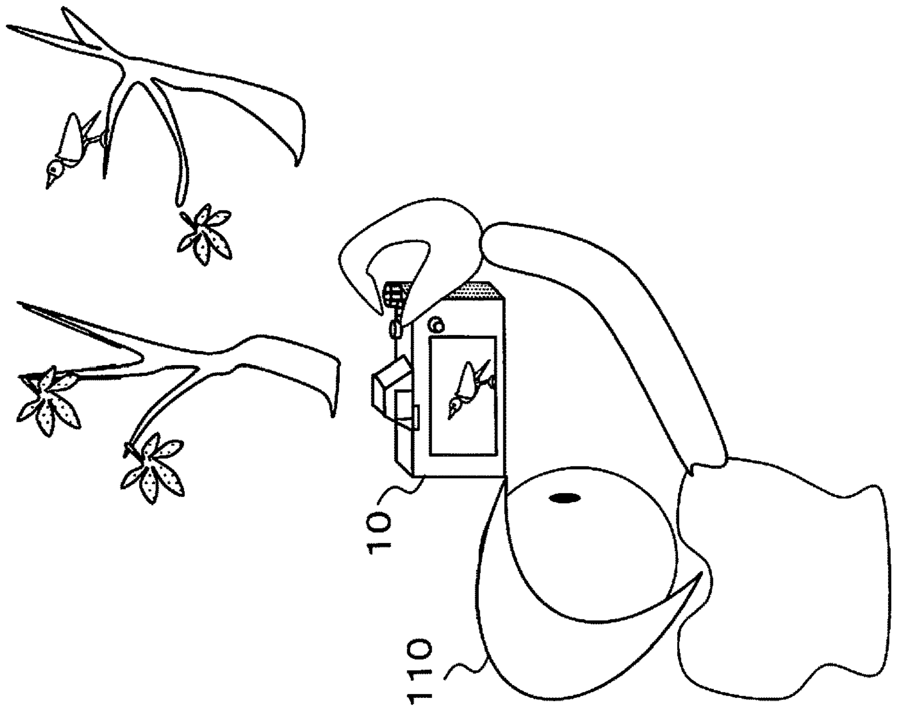

In this way, when the camera 10 that has acquired the bird inference model shoots a bird, as a shooting target, the camera 10 can display shooting guidance and action guidance etc. that are suitable for shooting a bird, as shown in FIG. 5A. However, when the Eiffel tower is photographed with this camera 10, as shown in FIG. 5B, it is not possible to perform sufficient shooting guidance and action guidance with the bird inference model that has been stored in the camera 10.

Figure 4C:
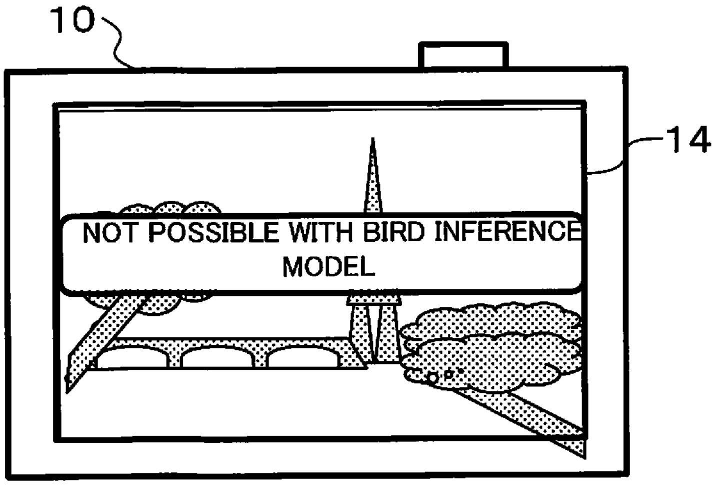

Therefore, the fact that it is not possible to provide shooting guidance with the bird inference model that is stored in the camera is displayed on the display section 14, as shown in FIG. 4C or FIG. 5B (details of the display method will be described later). Also, what inference model should be applied may be inferred using image recognition, and that inference result displayed. As a result, if there are a plurality of inference models, these may be displayed as candidates.

In the case shown in FIG. 4C, text display of "not possible with a bird inference model" is performed together with through image display on the display section 14. However, it is also possible to perform guidance display to give shooting hints to the user, and not just this display. Specifically, it is often the case that various subjects are contained in the through image. For example, in a case where it has been recognized by image recognition that there is a tree within the through image, if it is possible to infer that there is a possibility that a bird is perched in the tree, display such as "if you are looking for birds, there may be one in the tree" may be performed.

Also, in FIG. 5B, the fact that shooting guidance is not possible is displayed by marking with a diagonal line 14*a* on the display section 14. This warning display may be performed as a result of the fact that the inference engine has performed inference using a give up model (refer to S31 in FIG. 6B and S57 in FIG. 7). In this case also, as was described previously, an inference model for birds is maintained during the specified period. A learning request may be issued after the specified period. It should be noted that as warning display of the fact that it is not possible to perform sufficient shooting guidance and action guidance etc., besides visually displaying on the display section 14 warning may also be issued using sound.

Next, operation of the camera 10 will be described using the flowcharts shown in FIG. 6A and FIG. 6B. This flow is executed by the control section 17 within the camera 10 implementing the flowcharts shown in FIG. 6A and FIG. 6B using programs that have been stored in memory.

If the processing flow for camera control is entered, it is first determined whether or not the camera is in shooting mode (S1). In this flow, only two modes of the camera 10 will be described, namely a shooting mode and a learning mode. It is, however, also possible to execute other modes besides these two modes, such as playback mode. If learning mode has not been set using the operation section 15, it is determined to be shooting mode. It should be noted that learning mode is a mode in which the user requests generation of inference models to the learning section 25 using the setting control section 17*d*.

If the result of determination in step S1 is shooting mode, then image input is performed (S3). In this step, image data is input by the imaging section 11, and a through image is displayed on the display section 14 using this image data that has been input.

If image input has been performed, next it is determined whether or not an inference model has already been determined (S5). At least one individual inference model (individual dictionary) is stored in the storage section 12*a* within the inference engine 12, and preferably a plurality of individual inference model are stored. General-purpose inference models are also stored in the storage section 12*a*. In this step it is determined whether or not an individual inference model or a general-purpose inference model is selected.

If the result of determination in step S5 is that an inference model has not been determined, an inference model with high reliability is selected (S7). Here, the control section 17 analyzes a shooting scene using images that were input in step S3. An individual inference model (or general-purpose inference model) of high reliability that fits the shooting scene is then selected. Specifically, provisional inference may be sequentially performed using a plurality of individual inference model that are stored in the camera, and an individual inference model among those stored individual inference models that has the highest reliability selected. Also, when analyzing a shooting scene, an inference model for shooting scene analysis is prepared, and determination may be performed using this inference model. Also, when analyzing shooting scenes, in addition to images that have been acquired in step S3, position information etc. that has been acquired using GPS (Global Positioning System) etc. may also be used. As a shooting scene, for example, it may be possible to differentiate shooting target, such as a shooting scene of a bird, a shooting scene of the Eiffel tower etc.

If an inference model has been selected in step S7, or if the result of determination in step S5 was that an inference model has already been determined, next inference is performed (S9). Here, inference for shooting guidance and/or shooting control is performed using an inference model that is stored in the storage section 12*a* of the inference engine 12 and has been selected. For example, inference in order to provide action guidance to the photographer, for example, guidance as to at what shooting location to shoot a photograph that will receive evaluation from a third party, is performed using a setting inference model 12*aa*. Also, inference for providing guidance relating to exposure control values, focal length (zooming), focus position, composition etc. in order to shoot a photograph that will be evaluated by a third-party, or inference for shooting control values, is performed using an assist inference model 12*ab*. Advice and shooting control are performed in step S19, which will be described later, based on the inference results here.

Once inference has been performed, it is next determined whether or not reliability is high (S11). Here, reliability of inference by the inference engine 12 is determined. As reliability, a LOSS value may be calculated, for example. In a case where deep learning has been performed with an exercise that has been previously solved, a LOSS value is a difference between an inference result with an inference model that has been generated by deep learning and the previously known solution.

If the result of determination in step S11 is that reliability is low, an inference model is maintained for the specified period (S13). There may be cases where reliability of the inference model temporarily drops, for reasons such as the shooting target changing. For example, the shooting target may move out of the frame as a result of the user waving the camera around. Therefore, the inference model for inference is maintained without being changed for the specified period. By maintaining the inference model for the specified period it is possible to use the inference model that was selected in step S7 when the shooting target once again enters the frame. It should be noted that as the specified period, a period normally required from when the shooting target leaves the frame until the shooting target once again returns to the frame should be ensured.

If the specified period has elapsed, next physical object determination is performed (S15). Here, similarly to as was described in step S7, it is determined what a taken scene is, and it is determined whether or not an inference model that is suitable for the taken scene that has been determined is stored in the storage section 12*a*. If the result of this determination is a physical object (shooting scene) that is in an inference model, the inference model is changed and step S11 is returned to.

On the other hand, if the result of determination in step S15 is a physical object (shooting scene) that is not in an inference model, next the physical object is made a candidate for a learning request (S17). Here, since reliability of inference for images that were input in step S3 is low, it could be said that an inference model that is stored within the camera 10 does not fit the shooting style of the user. Images and associated data of those images are therefore stored so that they will be considered when requesting learning to the learning section 21. In step S29, which will be described later, learning is requested using this information that has been stored also. Also, in this step S17, warning display of the fact that an inference model is not suitable and it is not possible to perform shooting guidance etc. is performed (refer, to FIG. 4C). Also, since the camera 10 is not provided with a suitable individual inference model, inference is performed using a general-purpose inference model and advice on shooting control may be performed. To use this general-purpose inference model, the process may be made to return from step S17 to step S9.

Returning to step S11, if the result of determination in this step is that reliability is high, advice and shooting control are performed in accordance with inference (S19). Here, shooting guidance is displayed on the display section 14, and shooting control such as exposure control values, focal length (assuming), focus position, etc., are performed in accordance with the inference result of step S9. This shooting control may be automatically set based on the inference result, and shooting advice may be displayed on the display section 14 and then the user may perform manual setting.

If advice etc. has been performed in accordance with the inference in step S19, or if a learning request has been performed in step S17, it is next determined whether or not it is movie shooting or still picture shooting (S21). The user operates a movie button or the like of the operation section 15 in the case of performing movie shooting, and operates a release button of the operation section 15 when performing still image shooting. In this step, determination is based on whether or not these operation members have been operated.

If the result of determination in step S21 is movie or still image shooting, shooting is performed and resulting images are stored (S23). Image data that has been acquired by the imaging section 11 is subjected to image processing for storage in the image processing section 17*b*, and this image data that has been processed is stored by the storage control section 17*c* in storage section 16. Also, in the case of movie shooting, movie storage is performed until the user performs a completion operation using the operation section 15.

If shooting and storage have been carried out in step S23, or if the result of determination in step S21 was not movie or still image shooting, processing returns to step S1.

Returning to step S1, if the result of determination in this step is not shooting mode, processing advances to step S25 and after, and a request for learning is performed in the learning section 21. It is first determined whether or not there is inference model acquisition (S25). In a case where the user requests creation of an inference model that is suitable for an individual shooting target, a setting operation is performed using the operation section 15. In this step it is determined whether or not the setting control section 17*d* has performed a setting operation for the purpose of inference model setting. For example, in a case where the user has traveled to the Eiffel Tower and taken a photograph, as in previously described FIG. 3, there may be no inference model that is suitable for shooting the Eiffel Tower stored in the camera 10. In this type of case, the user operates the operation section 15 and performs an operation in order to obtain an inference model. Also, this setting operation may also be performed in a case where it has been noticed at the time of shooting that an inference model that is suitable for a shooting target the user wants is not stored.

Also, besides the user performing a setting operation using a manual operation in step S25, the camera 10 may also perform setting of an inference model creation request automatically. Specifically, the control section 17 within the camera determines whether or not an inference model within the inference engine 12 is suitable for a shooting target user wants, and if result of this determination is that it has determined that the inference model is not suitable, creation of an inference model that is suitable for the shooting target user wants may be requested to the learning section 21 within the external unit 20. For example, in a case where reliability of an inference result is low at the time of shooting, since a physical object is made a candidate of a learning request (refer to S17 in FIG. 6A), creation of an inference model may be requested based on this candidate. Also, this is not limiting, and shooting targets the user tends to like may be detected, and if there is an inference model that is insufficient a request issued. In these cases, since the camera 10 predicts a shooting target the user wants before shooting, it is possible to store an inference model that is required in the camera in advance.

If the result of determination in step S25 is to acquire an inference model, next setting of a physical object is performed (S27). Since the user sets a shooting physical object (shooting scene) using the operation section 15, this shooting physical object that has been set is acquired. It should be noted that setting of a shooting physical object may be performed using text input using the operation section 15 (input of "bird" in FIG. 4A), may be performed using voice input if the camera is provided with a microphone, and setting may be performed by designating a taken image and performing scene analysis. Characteristics of the physical objects may also be designated.

Once a physical object has been specified, next a learning request is issued (S29). Here, the setting control section 17*d* within the control section 17 issues a request to the learning section 21 within the external unit 20 so as to generate an individual inference model that is suitable for shooting a physical object (shooting scene) that was set in step S27. In the case of a request to generate an inference model to the learning section 21, the fact that this request has been issued may be displayed on the display section 14. Further, display of an inference model generation request is limited to when permission has been granted by the user having operated the operation section 15, and in a case where generation of an inference model to the learning section 21 within the external unit 20 has been requested from the camera 10 and permission has not been granted, the inference model generation request is not performed.

If generation of an inference model has been requested to the learning section 21 an inference model is generated in the external unit 20 (refer to S49 in FIG. 7), and once the inference model has been generated it is transmitted to the camera (refer to S59 in FIG. 7). The learning section 21 performs learning using images that have been formed by the camera 10 and associated data, and images that have been stored in the external image DB 27 and associated data. In the event that learning has been requested, images that have been formed by the camera 10, and associated data, are also transmitted. For example, images that have been deleted from the storage section 16 of the camera 10 are made failed images, and images that have been printed out and other images that have been contributed to a server or the like are made successful images, and both sets of images can be used as training data.

Once a learning request has been performed, next an inference model is acquired (S31). Here, an inference model that was generated by the input-output modeling section 24 is acquired and stored in the storage section 12*a* by way of the communication section 22 and the communication section 13. The inference model may be stored by overwriting a storage region of the storage section 12*a*, and may be written to another empty region. Also, in the case where the inference model is a file format, it may be stored in the storage section 12*a* in that file format. A plurality of inference models may be stored, and selectively set in the inference engine 12.

A give up model (inference model for poor determination, second inference model) may also be acquired in this step S31. As was described in FIG. 4C and FIG. 5B, with this embodiment, with an inference model (dictionary) that has been stored within the camera 10, warning display is performed if it is not possible to perform shooting guidance etc. A give up model is an inference model for performing this warning display. The inference engine 12 performs inference as to whether or not shooting guidance that is suitable to a shooting scene can be performed, based on a give up model that has been stored.

If acquisition and storage of an inference model has been performed in step S31, or if the result of determination in step S25 is that an inference model is not acquired, processing returns to step S1 in the previously described processing is executed.

In this way, in the camera control flow shown in FIG. 6A and FIG. 6B, it is determined whether or not an inference model is selected (S5), and if an inference model is selected shooting guidance is performed by performing inference using this inference model (S9, S19). Also, in a case where an inference model is not selected an inference model is selected in accordance with a shooting scene (S7). Also, reliability of an inference result is determined (S11), and shooting advice etc. is performed if reliability is high (S19). On the other hand, if reliability of an inference result is low, the inference model is maintained for a specified period (S13).

Also, in the event that an inference model that is suitable for shooting a physical object is not stored, images and associated data this time are stored, and referenced when requesting learning to the learning section 21 (S17). A physical object is also specified by the user by manual operation etc. (S27), and an inference model is acquired from the learning section 21 (S29, S31). A give up model, for inferring that it is not possible to perform shooting guidance that is suitable for shooting with the inference model, is also acquired (S31). Warning display that it is not possible to perform shooting guidance that is suitable to shooting is performed using this give up model.

Next, a learning operation in the learning section 21 of the external unit 20 will be described using the flowchart shown in FIG. 7. This flow is executed by the control section 26 within the external unit 20 implementing the flowchart shown in FIG. 7 using programs that have been stored in memory.

If the external unit control flow is started, it is first determined whether or not there is a learning request (S41). As was described previously, the camera 10 issues a learning request to the learning section 21 in steps S17 and S29. In this step, determination is based on whether or not a learning request has been received from the camera 10 by means of the communication section 22. If the result of this determination is that there is not a learning request, a standby state is entered.

If the result of determination in step S41 is that there is a learning request, next physical object type is set (S43). If the camera 10 issues a learning request, specifying of a physical object is performed, and so in this step the type of physical object is set.

Next, a learning matrix is set (S45). Here, the population creation section 23 sets a range for population of image data for the external image DB 27, based on the type of physical object that was set in step S43. If deep learning (machine learning) is performed, it is preferable to appropriately set a learning matrix so that it is possible to perform learning with good efficiency.

If a learning matrix has been set, next physical object position information is set (S47). At the time of learning, if there is position information of a physical object this is set together with a learning matrix. For example, in the case of generating an inference model for shooting the Eiffel Tower, positional information of the Eiffel Tower is set. It should be noted that setting of physical object positional information may be omitted depending on the learning demands.

If physical object position information has been set, next an inference model is generated (S49). Here, the input output modeling section 24 generates an inference model based on a physical object etc. that has been set. Specifically, as was described previously, the input output modeling section 24 performs learning using images that have been formed by the camera 10 and associated data, and images that have been stored in the external image DB 27 and associated data. Also, the camera 10 transmits taken images and associated data in the event that learning has been requested. For example, images that have been deleted from the storage section 16 of the camera 10 are made failed images, and images that have been printed out and other images that have been contributed to a server or the like are made successful images, and both sets of images can be used as training data.

If generation of an inference model has been performed, it is determined whether or not reliability of inference is greater than or equal to a specified value (S51). Here, reliability of the inference model that was generated in step S49 is calculated. Reliability determination is performed, for example, by calculating the previously described LOSS value etc.

If the result of determination in step S51 is that inference reliability is not greater than or equal to a specified value, a learning matrix is set again (S53). Here the learning matrix that was set in step S45 is set again. The method of setting the learning matrix again may be to increase or conversely reduce a number of matrices of input images using associated data of images. Training data may also be changed. For example, images that the user has deleted from the storage section may be made failed images and images that the user has printed out may be made successful image.

It is then determined whether or not the number of times that the learning matrix has been set again is greater than or equal to a specified number of times (S55). Even if the learning matrix has been set again, there may be cases where the reliability does not become greater than or equal to a specified value. In this step, determination is based on the number of times that the learning matrix has been set again. If the result of this determination is that the learning matrix has not been set again the specified number of times or more, processing returns to step S47, an inference model is generated again, and reliability is determined.

On the other hand, if the result of determination in step S55 is that the number of times the learning matrix has been set again is greater than or equal to the specified number of times, a give up model is generated (S57). The give up model is an inference model (dictionary) for determining that it is not possible to perform shooting advice etc. for the physical object that has been requested (warning display). It is possible for generation of the give up model to be learned with a flowchart such as was described in FIG. 7, similarly to a normal inference model. That is, images for which correct inference of physical object position was not possible, among images that were used as input for the inference model that was generated in step S49, are collected together and made training data (corresponding to a learning matrix for step S45). An inference model may then be generated in such a way that as a result of input of the images among the images among the training data, results are obtained as output such that positions of physical objects cannot be inferred.

As was described previously, for shooting opportunities under various conditions, when there has been inference for images that have been input by the camera 10, there may be cases where inference models give no high reliability value at all. The give up model can be generated using these types of conditions as they are. For example, a give up model may be generated by performing learning using images that exhibited low reliability. Also, images that the user was unhappy with or images that the user has deleted may be collected together, and a give up model generated by performing learning with these images as training data. Also, when generating an application-specific inference model, training data that have not obtained a reliability of the specified level or more may be collected together from among training data and made separate training data, and results of having performed learning using this training data made a separate inference model (implemented by S31 in FIG. 6B).

Also, a give up model may also display reliability for a case where an inference model that has been stored in the camera 10 is used. For example, in a case where a through image has been input, the give up model may be an inference model that can perform display such as reliability with a bird inference model is 40%, reliability with a scenery inference model is 40%.

As was described previously, it is possible to determine suitability of an inference model to a scene or user without using a give up model. Using images that were used when obtaining a give up model by learning as training data, an inference model for separate shooting guidance desired by the user (or that will be desired, or more appreciated) may be created. At this time, learning may be performed by gathering together good images that are similar to failed images as training data for learning. Also, if shooting settings which are common to good images are learned first, and then learning is performed such that differences between good images and unsatisfactory images constitute a learning result, the result will be guidance information so as to resolve those differences, and it is possible to create a new inference model for guidance.

If a give up model has been generated in step S57, or if the result of determination in step S51 is that reliability of inference is a specified value or greater, an inference model is transmitted (S59). Here, an inference model that was generated in step S49 or a give up model that was generated in step S57 is transmitted by means of the communication section 22 and the communication section 13 to the camera 10. Once an inference model has been transmitted processing returns to step S41.

In this way, in the flow for external unit control, if a learning request is received from the camera 10 (S41), physical object type is set, and after setting a learning matrix in accordance with the type of this physical object (S45), an inference model is generated (S49). Reliability of this inference model that has been generated is obtained, and if reliability is low the learning matrix is set again and inference is performed again (S53, S49). However, if reliability does not become high even if inferences performed a specified number of times (S55 Yes), a give up model is generated (S57) and it is made possible to infer that it is not possible to perform shooting advice.

A second embodiment of the present invention will now be described using FIG. 8 to FIG. 10B. The imaging system of the first embodiment was comprised of the camera 10 and the external unit 20. However, the imaging system of the second embodiment comprises, in addition to an external unit 300 and a capture device 100 having a function as an imaging device, an AI speaker 200 and a smart home electrical appliance 400.

The capture device 100 is a device for acquiring data (information), such as an imaging device of a camera etc. or an IC recorder of a sound recording device etc., and collects information such as image information and sound information. The capture device 100 comprises a first communication section 101, second communication section 102, image acquisition section 103, a control section 104, display section 105, storage section 106, acquisition operation section 107, and state determination section 108.

The first communication section 101 and the second communication section 102 have a communication circuit that has a Wi-Fi communication function, and a communication circuit that has a Bluetooth® communication function. The first and second communication sections 101 and 102 can perform short-range wireless communication, and are capable of communicating with first and second communication sections 301 and 301 of the AI speaker 200. Either one of the first communication section 101 and the second communication section 102 is capable of communicating (also called advertise communication) with the AI speaker 200 at specified time intervals, even if the capture device 100 is powered off. Advertise is a communication method whereby a transmission source transmits a packet, in which source information has been placed at specified time intervals, in the vicinity. The first communication section 101 or the second communication section 102 is capable of advertise transmission, and functions as a communication circuit (communication control section) that transmits contents that have been acquired by the imaging device, or a request to generate an individual inference model that is suitable to a shooting target, to the outside.

The image acquisition section 103 is an imaging section for image data acquisition and/or a sound acquisition section for sound data acquisition.

The control section 104 is a controller comprising one or two or more processors, and has a CPU (Central Processing Unit), peripheral circuits and a memory etc., and the CPU controls each section within the capture device 100 in accordance with a program that has been stored in memory. The control section 104 functions as a controller (determination section) that predicts a shooting target that the user wants before shooting, and based on this prediction determines whether or not inference model that is stored in the storage section 106 is suitable for shooting of the shooting target that has been predicted. In this case, the AI speaker 200 (information terminal) predicts the shooting target the user wants, and the capture device 100 may receive this prediction result. Also, in a case where the imaging device performs imaging under different conditions (for example, different seasons, different time and date, different place, different user, different inference model usage period) and an inference model has performed inference using results of this imaging, if there is no improvement in reliability with the inference model under any conditions, the controller (determination section) may determine whether or not the inference model is suitable for shooting a shooting target that has been predicted.

In a case where the capture device 100 is a camera such as shown in FIG. 1, the display section 105 has a display panel (display) similar to the display section 14, and can display images etc. that have been acquired by the image acquisition section 103. Also, in a case where the capture device 100 is an IC recorder, it has a speaker etc. The display section 105 can perform menu display and display of information etc. from the AI speaker, regardless of whether the capture device 100 is a camera or an IC recorder.

The storage section 106 has an electrically rewritable nonvolatile memory, and stores image data and sound data that have been acquired by the image acquisition section 103. Programs for operation by the CPU within the control section 104 also stored.

The acquisition operation section 107 is an interface for the user to issue instructions to the capture device 100. The acquisition operation section 107 has operation members and touch panel etc. for the user to set various functions of the capture device 100. The state determination section 108 determines state of the capture device 100. For example, if the capture device 100 is a camera, states such as a state of performing through image display of images, a state of performing still image shooting or movie shooting, a state of performing playback display of stored images etc., are determined. Also, if the capture device 100 is an IC recorder states such as a state of performing recording and a state of playing back sound that has been recorded etc. are determined.

If an inference model is received from the AI speaker 200, the inference engine 109 infers shooting guidance for shooting a photograph that will receive high evaluation from a third party, using this inference model. Also, in the case of an IC recorder, recording guidance is inferred in order to perform recording that will receive high evaluation from a third party.

The AI speaker 200 is speaker comprising a wireless communication connection function and a voice operation assistant function, and is loaded with artificial intelligence. The AI speaker 200 functions as an information terminal that is loaded with artificial intelligence and has a recording operation assistant function. It should be noted that with this embodiment description will be given of an example that uses an AI speaker as an information terminal. However, the information terminal is not limited to being an AI speaker, as long as it is a device that can use artificial intelligence and/or has an assistant function. It is also possible to use a smartphone or PC (personal computer to) having a sound input section as the information terminal, and in this case it is possible to use as a "voice-activated information terminal" that the user can speak into. The AI speaker 200 has a first communication section 201, a second communication section 202, third communication section 203, an information input section 204, a control section 205, a sound input section 206, and a storage section 207 etc.

The first communication section 201 and the second communication section 202 have a communication circuit that has a Wi-Fi communication function, and a communication circuit that has a Bluetooth® communication function, similarly to the communication sections within the capture device 100. The first and second communication sections 201 and 202 can perform short-range wireless communication, and are capable of communicating with first and second communication sections 101 and 102 of the capture device 100. Either one of the first communication section 101 and the second communication section 102 is capable of communicating with the AI speaker 200 at specified time intervals, even if the capture device 100 is powered off. Also, the first communication section 201 and the second communication section 202 can perform communication with a communication section 402 of the smart household appliance 300. The third communication section 203 is capable of communicating with a third communication section 301 within the external unit 300 by means of the Internet. At least one of the first communication section 201 and the second communication section 202 functions as a communication circuit (communication section) for performing communication with the imaging device.

The information input section 204 inputs various information such as image data. For example, it is possible to input images around the AI speaker 200 and image information of people who have come close to the AI speaker 200. It may also be a device that is capable of inputting information as a result of the user operating a keyboard or touch panel etc. The sound input section 206 has a microphone and a sound signal processing circuit etc. and inputs the voice of the user etc. The sound input section 206 functions as a sound data output circuit (sound input section) that is input with the voice of the user, converts this voice to voice data, and outputs the voice data.

The control section 205 is a controller comprising one or two or more processors, and has a CPU (Central Processing Unit), peripheral circuits and a memory etc., and the CPU controls each section within the AI speaker 200 in accordance with a program that has been stored in memory. The control section 205 analyzes user requests and potential requests based on information such as sound and images that have been input by the sound input section 206 and the information input section 204. The control section 205 responds by means of a speaker 208 based on the results of this analysis. Analysis and responses for user requests are performed by the AI speaker 200 in cooperation with an external server etc.

The control section 205 can recognize user's schedules and discontent by analyzing the user's conversations etc. For example, the fact that the user has planned to go sightseeing to Paris on a certain date and to visit the Eiffel Tower is analyzed by the control section 205 from conversations, and it is determined that there is not an inference model for shooting the Eiffel Tower in the inference engine 109 of the capture device 100. In this case, the control section 205 requests creation of an inference model for shooting the Eiffel Tower to the external unit 300 (refer to S91 in FIG. 10A and S97 and S99 in FIG. 10B). Also, by analyzing the users conversation it is recognized that the user has an interest in shooting birds, but is dissatisfied because appropriate shooting guidance is not issued when shooting photographs. In this case, the control section 205 requests creation of an inference model for shooting birds to the external unit 300 (refer to S91 in FIG. 10A and S97 and S99 in FIG. 10B).

The control section 205 functions as a controller that analyzes voice data and predicts a shooting target the user wants. The control section 205 also functions as a controller that is input with information relating to inference models stored in the imaging device by means of the communication circuit, analyzes sound data and predicts the user's shooting target, determines whether or not the inference model is suitable for shooting the shooting target, and if the result of this determination is that the inference model is not suitable for shooting causes an inference model that is suitable to shooting of the shooting target to be learned in an external learning device (refer, for example, to S91 in FIG. 10A, and S97 and S99 in FIG. 10B). If an inference model is generated by the external learning device, and this inference model is received, the control section transmits the inference model to the imaging device (S99 in FIG. 10B).

A speaker 208 converts a response to the user that has been generated by the control section 205 to sound, and conveys this to the user.

The storage section 207 has an electrically rewritable nonvolatile memory, and has storage regions for unit information 207*a* and access learning 207*b*. The unit information 207*a* stores information on the capture unit 100 and the smart home appliance 400 that are capable of communicating with the AI speaker 200. As this unit information 207*a*, there is various information, such as what type of capture device there is, what type of smart home appliance there is etc. The access learning 207*b* stores client type information, and request content and inference model etc. when performing learning such as deep learning in the external unit 300.

The external unit 300 can be connected to the AI speaker 200 by means of the Internet. The external unit 300 comprises the third communication section 301, an input output modeling section 302, a retrieval section 303, control section 304, storage section 305, database (DB) section 305*a* and information organization section 305*b*. The third communication section 301 is capable of communicating with the third communication section 203 within the AI speaker 200 by means of the Internet.

The input output modeling section 302 performs deep learning (machine learning) using so-called artificial intelligence (AI), similarly to the input output modeling section 24. Specifically, using an image data population (may also be voice data etc.) that has been stored in the storage section 305, the input output modeling section 302 generates a general-purpose inference model or an individual inference model, by deep learning. The input output modeling section 302 has a configuration such as shown in FIG. 2. Detailed structure etc. is the same as in FIG. 2, and so description is omitted. An inference model (dictionary) that has been generated by the input output modeling section 302 may be sent by means of the AI speaker 200 to the capture device 100, and may also be transmitted directly to the capture device 100 without going via the AI speaker 200.

The retrieval section 303 performs retrieval from among image data (may also be voice data etc.) that has been stored in the storage section 305. In a case of performing deep learning using the input output modeling section 302, a population may be created using the retrieval section 303.

The control section 304 is a controller comprising one or two or more processors, and has a CPU (Central Processing Unit), peripheral circuits and a memory etc., and the CPU controls each section within the external unit 300 in accordance with a program that has been stored in memory. If there is a learning request from the AI speaker 200, the control section 304 causes execution of deep learning in the input output modeling section 302, in accordance with the request that has been received.

The storage section 305 has an electrically rewritable nonvolatile memory, and stores data such as image data and sound data. Unit information 305*aa* and associated user information 305*ab* are stored in the database (DB) section 305*a*. The unit information 305*aa* stores information relating to units, such as a capture device or smart home appliance etc. that are connected to the AI speaker. The associated user information 305*ab* is information relating to a user associated with a unit, such as a unit operator, and is stored in association with the unit information. The storage section 305 also has an information organization section 305*b*. The information organization section 305*b* organizes unit information and associated users that are stored in the DB section 305*a*. Specifically, information is stored by being organized regarding units that are used for each user, and regarding users associated with each unit.

A smart home appliance 400 is a household electrical appliance that is capable of connection to the Internet, such as a vacuum cleaner, television, air conditioner etc. The smart home appliance 400 comprises an information input section 401, communication section 402, functional part 404, control section 405, display section 406, storage section 407, and main function associated operation section 408.

If the smart home appliance 400 is a refrigerator, the information input section 401 has sensors etc. for inputting information depending on an interior temperature detection section, detection section for foodstuffs contained inside etc., and type of smart home appliance. The communication section 402 is capable of communicating with the third communication section 203 of the AI speaker 200. The functional part 404 executes functions in accordance with the type of smart home appliance. For example, if the smart home appliance is a refrigerator, interior temperature management of items stored in the refrigerator, creation of recipes in accordance with the contents, etc., are executed.

The control section 406 is a controller comprising one or two or more processors, and has a CPU (Central Processing Unit), peripheral circuits and a memory etc., and the CPU controls each section within the smart home appliance 400 in accordance with a program that has been stored in memory. The display section 406 has a display panel, and performs various display in accordance with the type of smart home appliance. The storage section 407 has an electrically rewritable nonvolatile memory, and stores various information in accordance with the type of smart home appliance 400. The main function associated operation section 408 is an interface for the user to instruct various operations to the smart home appliance 400, and has various operations sections etc.

Figure 9:
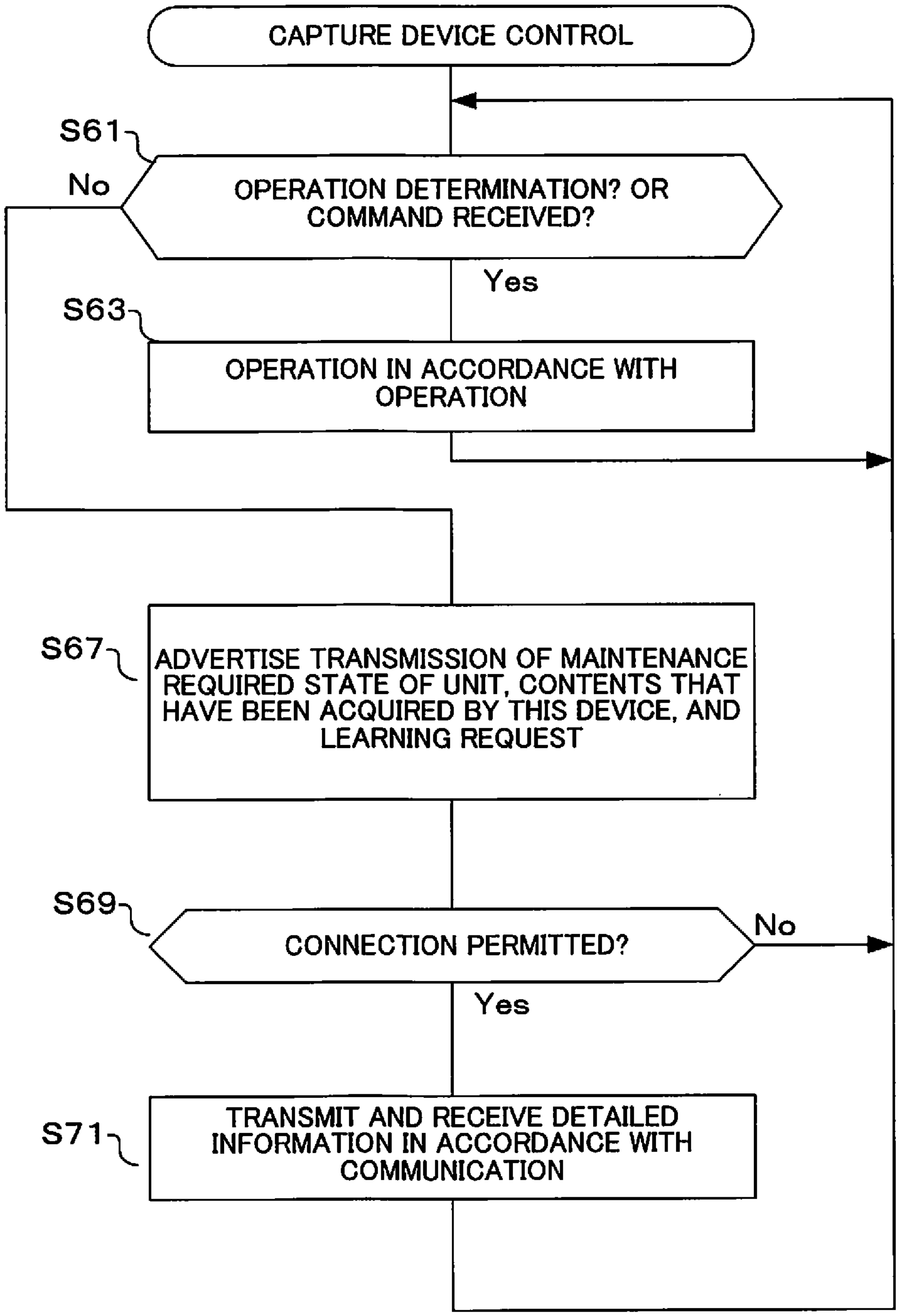
FIG. 9 is a flowchart showing operation of a capture unit (imaging device) of the imaging system of the second embodiment of the present invention.

Next, operation of the capture device 100 will be described using the flowchart shown in FIG. 9. This flow is executed by the control section 104 within the capture device 100 implementing the flowchart shown in FIG. 9 using programs that have been stored in memory.

If the flow for capture device control is commenced, it is first determined whether or not operation determination or a command has been received (S61). If the user operates an operation member such as a release button or recording start button, the acquisition operation section 107 detects operating state of this operation member. It is also determined whether or not the first communication section 101 or the second communication section 102 have received a command for operating the capture device 100 from outside. For example, in a case where the user operates a release button or the like of the capture device using a smart home appliance such as a smartphone, a command instructing this operation is received.

If the result of determination in step S61 is that there has not been an operation, or if a command has been received, operation is executed in accordance with the operation (S63). For example, if the capture device 100 is a camera, in the event that operation of a release button was detected in step S61, still image shooting is performed. Also, in the case of an IC recorder if it has been detected that a recording button has been operated, recording is performed. Also, when executing in accordance with operation, if there is shooting guidance or shooting guidance using an inference model, these may also be displayed. These items of guidance are displayed based on results that have been inferred by the inference engine 109. If operation has been executed in accordance with an operation, processing returns to step S61.

If there is no operation or a command has not been received in step S61, advertise transmission is performed (S67). The capture device 100 performs communication request (this signal is also called advertise communication) to the AI speaker 200 at specified time intervals. In this step, if a unit is in a state where it requires maintenance, that fact is notified by means of advertise transmission. Specifically, in a case where the capture device 100 requires maintenance, that fact is notified to the AI speaker 200. As maintenance there is, for example, notification of the fact that power supply voltage of the capture device is low, notification of the fact that memory capacity has been exceeded, or notification of the fact that product lifespan has been exceeded.

Also, in this step S67, contents that have been acquired by the capture device (such as image data and sound data), and a learning request, are made the subject of advertise transmission. For example, in a case where there is a photograph etc. that has been taken by the capture device 100, image data for that photograph is transmitted. Transmitting of the image data may be performed in a case where the user wishes those shooting results to be seen by a third party etc. Also, in a case where a generation of an individual inference model (individual dictionary) has been requested to the input output modeling section 302 of the external unit 300 by the user by means of the capture device, that fact is transmitted.

It is then determined whether or not there is connection permission (S69). In this step, it is determined whether or not a connection has been permitted from the AI speaker 200 as a result of an advertise transmission from the capture device 100 to the AI speaker 200. If the result of this determination is that connection has not been permitted, processing returns to step S61.

If the result of determination in step S69 is that connection has been permitted, detailed information corresponding to communication is transmitted and received (S71). Here, in a case where maintenance of a unit was requested in step S67, detailed information required for maintenance of the unit is acquired. Also, if a learning request has been transmitted, an inference model is received after the average model has been created. Once detailed information in accordance with communication has been transmitted and received, processing returns to step S61.

Figure 10A:
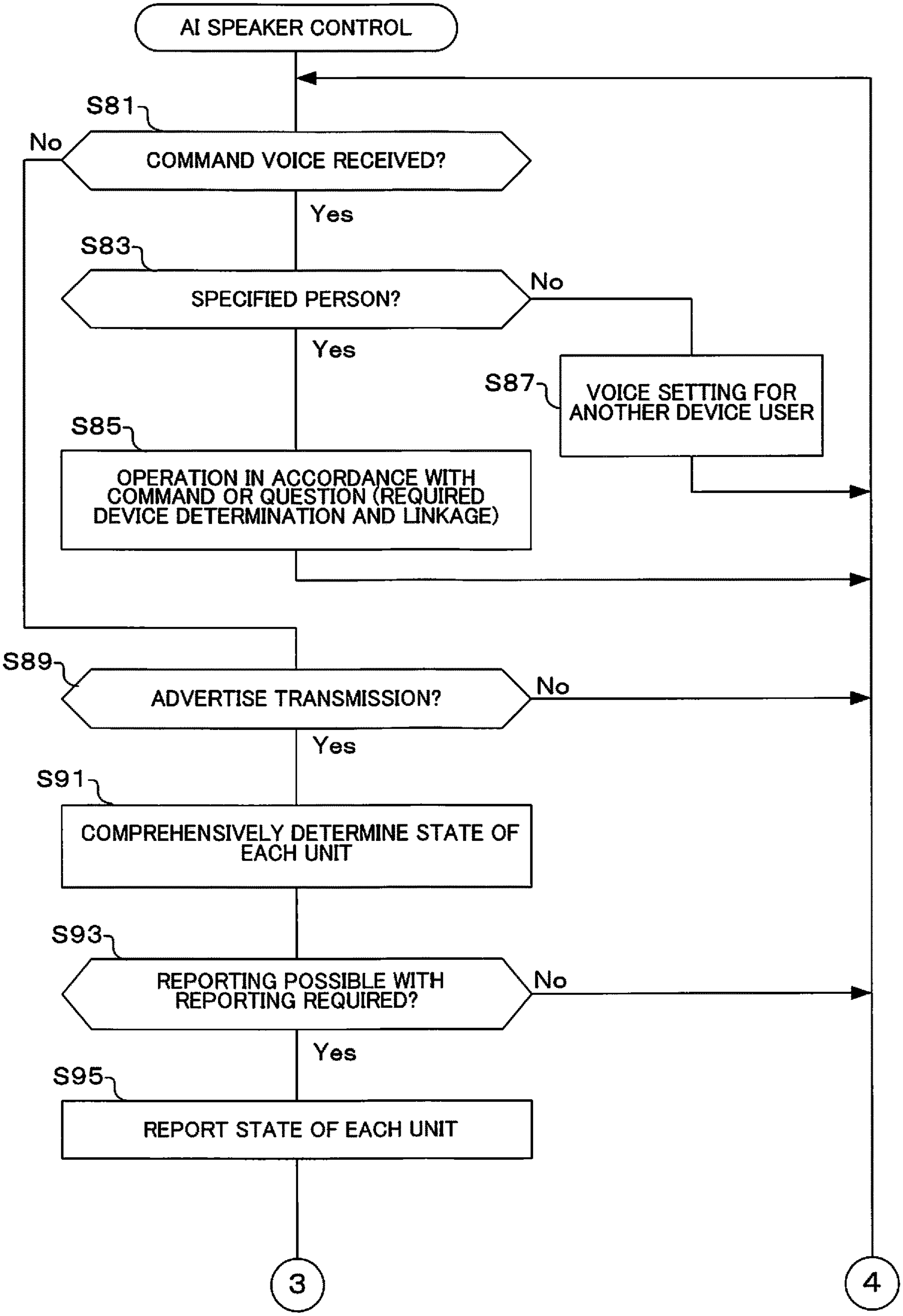
FIG. 10A and FIG. 10B are flowcharts showing operation of an AI speaker of the imaging system of the second embodiment of the present invention.

Next, operation of the AI speaker 200 will be described using the flowcharts shown in FIG. 10A and FIG. 10B. This flow is executed by the control section 205 within the AI speaker 200 implementing the flowcharts shown in FIG. 10A and FIG. 10B in accordance with programs that have been stored in memory.

If the flow for AI speaker control is commenced, it is first determined whether or not voice command has been received (S81). In a case where the user wants information from the AI speaker 200 or when the user requests processing etc., speech is uttered towards the AI speaker 200. The sound input section 206 converts this speech to speech data, and analyzes the meaning.

If the result of determination in step S81 is that command speech has been received, it is next determined whether or not it is a specified person (S83). Since the AI speaker has various individual information, disclosure for a question or the like or a response to a command differs depending on the person. Here speech data that was acquired in the sound input section 206 is analyzed, and it is determined whether or not it is for a specified person who is registered in the unit information 305*aa*.

If the result of determination in step S83 is a specified person, operation is executed in accordance with the commander question (S85). Here, if a command to cause operation of the smart home appliance 400 or capture device 100 has been received, operation corresponding to the command is transmitted to the smart home appliance 400 or capture device 100. In a case where a question has been received, a response is generated by the AI speaker and a server that has been connected to the AI speaker, and a response is provided as speech by means of the speaker 208. Once the processing of this step has been carried out, processing returns to step S81.

On the other hand, if the result of determination in step S83 is not a specified person, voice of the user is set for each unit (S87). Here, setting is performed as voice of a user for each unit. Specifically, the voice of the user that has been input by the AI speaker 200 is registered, and when registering this voice, that user's voice, and units that can be used, are set. For example, in a case where a user has provided input with their voice while holding the capture device 100, that voice and the capture device are stored in association with each other. By associating a user with a unit, it is possible to give a response to operations or questions in a range that does not invade privacy. For example, in a case where the voice of a person who is not associated with the capture device 100 is important, there may also be cases where information relating to the capture device 100 is avoided. Once the processing of this step has been carried out, processing returns to step S81.

Returning to step S81, if the result of determination is that command speech is not received, it is next determined whether or not there has been advertise reception (S89). As was described previously, the capture device 100 performs advertise transmission to the AI speaker in step S67. In this step it is determine whether or not this advertise transmission has been received. If the result of this determination is not advertise reception, processing returns to step S81.

If the result of determination in step S89 was advertise reception, state for each unit is determined comprehensively (S91). Here, comprehensive determination of information for each unit is determined based on information that has been transmitted from the capture device 100 or the smart home appliance 400. For example, if warning display is performed in cases such as where battery voltage of the capture device 100 is lowered, or where stored image data memory capacity is close to its limit, there are also cases where the user is not there and is unaware of the situation, or whether user will feel troubled if a normal warning is issued. Status of the user and the capture device 100 are therefore comprehensively determined, so as to give an appropriate response for steps S93 and onward.

If state has been comprehensively determined for each unit, it is next determined, with the need for reporting, at this point, whether reporting is possible (S93). Based on the determination in step S91 reporting is necessary, and now, it is determined whether or not reporting is possible. For example, in the case where there is nobody close to the AI speaker 200 and a voice cannot be heard, reporting is not possible. If the result of this determination is no, processing returns to step S81.

If the result of determination in step S93 is that warning is required and reporting is possible, state of each unit is reported (S95).

It is next determined whether or not there is a learning request (S97). If a learning request has been requested from the capture device 100 (S67), it is determined that there is a learning request. Also, the user's schedule is analyzed from the natural voice of the user that has been input by the sound input section 206 of the AI speaker 200, and whether or not there is a learning request may also be determined based on the results of this analysis. If the result of this determination is that there is not a learning request, processing returns to step S81.

If the result of determination in step S97 is that there is a learning request, a learning object is designated and requested to the learning server. Also, learning results are acquired and transmitted to the device that originated the request (S99). In the event that there is a learning request from the capture device 100, that learning request is transmitted to the input output modeling section 302 of the external unit 300, and creation of an inference model is requested. Also, in a case where analysis has been performed from the natural voice of a user that has been acquired by the AI speaker 200, a learning request is created and transmitted to the input output modeling section 302, and generation of an inference model is requested. For example, in a case where the user schedule is analyzed from the natural voice of the user that has been input, and there is not an inference model for the camera that is suitable to the user's destination (for example, the Eiffel Tower in Paris), a request is generated so as to create an inference model (dictionary) that is suitable for shooting this destination. Also, while the user intends to shoot photographs, similarly to the case where there is not a camera inference model, a request is issued so as to generate an inference model. Also, in a case where an inference model has been received from the input output modeling section 302, this inference model is transmitted to the device that originated the request.

Continuing on, it is determined whether or not speech of a question has been received (S101). In this step, voice data that has been acquired by the sound input section 206 is analyzed, and it is determined whether or not that voice data was a question to the AI speaker 200. If the result of this determination is that a question has not been received by means of voice, processing returns to step S81.

If the result of determination in step S101 is that voice for a question has been received, it is next determined whether or not it is a specified person (S103). Here voice data that was acquired in the sound input section 206 is analyzed, similarly to in step S83, and it is determined whether or not it is for a specified person who is registered in the unit information 207*a*.

If the result of determination in step S103 is not a specified person, news etc. or general information is reported (S105). As was described previously, the AI speaker 200 has information that relates to privacy. In the event that it is not a specified person, an answer is given to the question in a range of general information, so as not to invade privacy.

On the other hand, if the result of determination in step S103 is a specified person detailed state for each unit is reported (S107). For example, regarding a question such as what is the status of a particular smart home appliance, an answer is given using speech to the user who asked the question. Once detailed status has been reported, next the fact that reporting has been performed is reported to the device (S109). Here, question content, name of a specified person, and answer content are transmitted to the device.

If general information has been reported in step S105, or if reporting to a device has been performed in step S109, processing returns to S81.

Figure 10B:
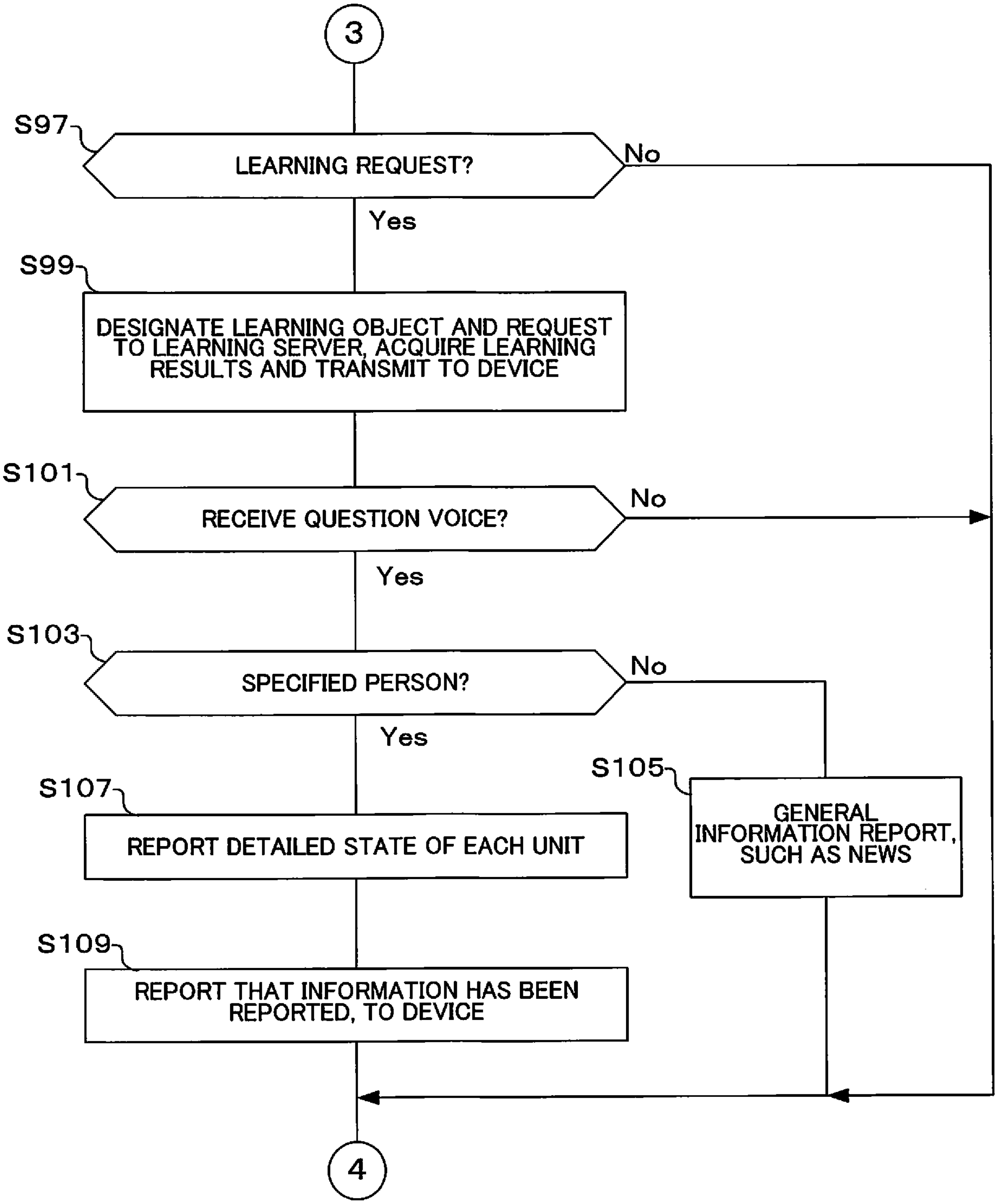

In this way, in the second embodiment of the present invention, the AI speaker 200 comprehensively determines states of the capture device 100 (S91 in FIG. 10A) and if, based on this determined state, a new inference model (dictionary) is required (S97 in FIG. 10B), requests learning to the input output modeling section 302 within the external unit 300 (S99 in FIG. 10B). If an inference model (dictionary) is received, it is transmitted to the capture device 100 (S99 in FIG. 10B). As a result even if the user does not deliberately request learning by means of the capture device 100, it is possible for the AI speaker to perform determination and acquire an inference model (dictionary) automatically.

As has been described above, with each of the embodiments of the present invention, in the event that an individual inference model used by an inference section is inappropriate, that fact is displayed and an appropriate inference model is requested from a learning section. This means that it is possible to give precise shooting guidance to the user even in the case where a suitable inference model is not provided in an imaging device.

Also, with the embodiments of the present invention, an image of a shooting target is formed and image data is output (refer, for example, to S3 in FIG. 6A), guidance display for when shooting a shooting target, or an inference model for performing automatic control, is stored in a storage section (refer, for example, to S31 in FIG. 6B), control of guidance display or inference for automatic control is performed (for example, S9 in FIG. 6A), it is determined whether or not an inference model is suitable for shooting a shooting target that the user wants (for example, S11 in FIG. 6A), and in the event that is has been determined as a result of this determination that the inference model is not suitable for shooting a shooting target the user wants, generation of an inference model that is suitable for a shooting target the user wants is requested to an external learning device (for example, S17 in FIG. 6A). This means that it is possible to receive an inference model that is suitable for the shooting target in a case where reliability of an inference model (dictionary) is low.

Also, an embodiment of the present invention is a control method for an information terminal that has communication circuits for performing communication with an imaging device, has artificial intelligence installed, and has a voice operation assistant function. With this control method, a user's voice is input and converted to voice data (refer, for example, to S81 in FIG. 10A), this voice data is analyzed and a shooting target the user wants is predicted (S91 in FIG. 10A), information relating to an inference model that is stored in the imaging device is input by means of a communication circuit, it is determined, based on prediction of the shooting target the user wants that has been analyzed, whether or not the inference model is suitable for shooting the shooting target, and if the result of this determination is that the influence model is not suitable for shooting (refer, for example, to S97 in FIG. 10B), an inference model that is suitable for shooting the shooting target is caused to be learned in an external learning device (refer, for example, to S99 in FIG. 10B). As a result, even if the user has not deliberately requested an inference model (dictionary) from the learning device, the information terminal performs comprehensive determination, and it is possible to request generation of a new inference model to the learning device.

As was described previously, as a benefit of inference that uses a give up model, an image for which shooting guidance etc. was given up on (image having high give up reliability) may be utilized as training data for generating an inference model for other shooting guidance desired by the user (or that they will desire, and that will be more appreciated). By analyzing images that have been given up, information that relates to images that the user wanted to take is understood. Also, as a result of analyzing give up images, information such as that there are weak subjects and weak scenes in an inference model that has been used, and that there is a need to improve the inference model, is also obtained. Give up images constitute teacher image that includes these items of information. It should be noted that at this time, learning may be performed by gathering together good images that are similar to those failed images as training data for learning. Also, if shooting settings shared by good images are learned first, and then learning is performed such that differences between good images and unsatisfactory images constitute learning results, it will result in guidance information so as to resolve those differences, and this guidance information can be included in a new inference model for guidance.

It should be noted that in each of the embodiments of the present invention, learning in the learning device has been performing using deep learning, but this is not limiting, and may also be any learning that uses artificial intelligence, such as machine learning. Also, the setting control section 17*d* (refer to FIG. 1) and the acquisition operation section 107 (refer to FIG. 8) set requests using input of text, but this is not limiting, and targets of machine learning (deep learning) may also be set by selecting setting items, and by the user designating one or a plurality of images that they like.

Also, with each of the embodiments of the present invention, a learning section receives a learning demand (request) from a camera or a capture device, but the invention is not limited to these devices and may also receive a learning demand (request) from an external unit such as a personal computer, portable information unit (including a smartphone) etc. In this case, results of having performed machine learning in the learning device (inference models etc.) do not need to be returned to the device that transmitted the learning demand, and may be transmitted to another external device. For example, in a portable information unit, such as a smart phone, a learning demand may be set and transmitted to the learning device, and then results of machine learning by the learning device transmitted to an imaging device (capture device) such as a camera. Specifically, setting and transmission of a learning demand is performed by the user on the portable information unit, the camera or capture unit receives an inference model that has been generated based on the request from the learning device, and display may be performed based on this inference model.

Also, with this embodiment, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone, a mobile information terminal, personal computer (PC), tablet type computer, game console etc., a medical camera, or a camera for a scientific instrument such as a microscope, a camera for mounting on a vehicle, a surveillance camera etc. In any event, it is possible to apply the present invention to a device that is capable of being input with image data, and is capable directly or indirectly accessing an external image database.

Also, in recent years, it has become common to use artificial intelligence such as being able to determine various evaluation criteria in one go, and it goes without saying that there may be improvements such as unifying each branch etc. of the flowcharts shown in this specification, and this is within the scope of the present invention. Regarding this type of control, as long as it is possible for the user to input whether or not something is good or bad, it is possible to customize the embodiment shown in this application in a way that is suitable to the user by learning the user's preferences.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising an image sensor that images a shooting target and outputs image data, a memory that stores inference models for performing guidance display or automatic control, when shooting the shooting target, an inference engine that performs inference for the control of the guidance display or automatic control, using the inference model, and a controller that, regarding whether or not the inference model is suitable for shooting of the shooting target, compares a value representing operating state of a specified inference model that is usable, or a confidence value of an inference result at the time of operation of the specified inference model, with a specified value, determines whether or not the inference model is suitable for shooting a shooting target intended by the user based on the result of this comparison, and depending on the determination, if it has been determined that the inference model is not suitable for shooting a shooting target intended by the user, requests generation of an inference model that is suitable for a shooting target intended by the user to an external learning device.

2. The imaging device of claim 1, wherein:

the controller determines whether or not the inference model is suitable for the shooting target, based on whether or not an inference model that is suitable for a shooting target that has been designated by the user is stored in the memory, or whether or not a result of inference using the inference engine is that images of low reliability are obtained, or whether or not it has been determined that the inference model used in the second inference engine is not suitable for the shooting target.

3. The imaging device of claim 1, wherein:

when the imaging device performs imaging under different conditions, and there is no improvement in reliability using the inference model under any conditions when inference has been performed with an inference model using the results of this imaging, the controller determines whether or not the inference model is suitable for shooting a shooting target that has been predicted to be shot by the user.

4. The imaging device of claim 1, wherein:

the inference engine has a second inference engine for determining whether or not the inference model is suitable for shooting a shooting target that has been predicted, and the second inference engine performs inference using a second inference model, and when the second inference model creates the inference model, images that do not obtain reliability of a specified level or higher, from among training data, are collected together as training data, and are results that have been learned.

5. The imaging device of claim 1, wherein:

the controller predicts a shooting target that the user wants before shooting, and based on this prediction determines whether or not the inference model that is stored in the storage section is suitable for shooting of the shooting target that has been predicted.

6. The imaging device of claim 1, further comprising:

a display that displays a through image based on the image data, and wherein if the controller determines, using the inference model at the time of shooting the shooting target, that an inference model is not suitable for favorable shooting of a shooting target the user wants, warning display is performed on the display.

7. The imaging device of claim 1, wherein:

the controller calculates reliability of inference that is performed by the inference engine, and if this reliability is higher than a specified value determines that inference to be suitable for shooting of the shooting target.

8. The imaging device of claim 1, wherein:

the memory is capable of storing a plurality of inference models; and the inference engine performs inference by selecting an inference model that is appropriate for the shooting target from among the plurality of inference models.

9. The imaging device of claim 1, wherein:

the memory further comprises a general purpose inference model; and the inference engine performs inference by selecting the general-purpose inference model in the event that it has been determined by the determination section that an inference model is not appropriate to shooting of the shooting target.

10. The imaging device of claim 1, wherein:

the controller sets requirements for generating the inference model, and transmits the requirements that have been set to the external learning device.

11. The imaging device of claim 10, wherein:

the controller sets requirements by designated at least one of type of shooting target and position information, and transmits the inference model together with the requirements that have been set, to the external learning device.

12. The imaging device of claim 1, wherein:

the inference engine maintains the inference model for a specified period, even if it has been determined by the controller to not be suitable for shooting of the shooting target.

13. The imaging device of claim 1, wherein:

the memory stores a give up inference model, in order to infer that it is not possible to perform shooting advice or automatic control for a shooting target, and the inference engine performs inference for whether or not it is possible to perform the guidance display or automatic control, using the give up inference model.

14. The imaging device of claim 1, further comprising:

a communication circuit capable of advertise transmission, wherein the controller performs advertise transmission of contents that have been acquired by the imaging device, or a generation request for an inference model that is suitable for the shooting target, to the external learning device.

15. The imaging device of claim 1, wherein:

the controller, in a case where it has been determined that the inference model is not suitable for shooting a shooting target the user wants, when requesting generation of an inference model that is suitable for a shooting target the user wants to an external learning device, requests generation of the inference model to the external device after acquiring permission of the user.

16. A control method for an imaging device, comprising:

imaging a shooting target and outputting image data, storing inference models for performing guidance display or automatic control, when shooting the shooting target, in a storage section, performing inference for control of the guidance display, or automatic control, using the inference model, and regarding whether or not the inference model is suitable for shooting of the shooting target, comparing a value representing operating state of a specified inference model that is usable, or a confidence value of an inference result at the time of operation of the specified inference model, with a specified value, determining whether or not the inference model is suitable for shooting a shooting target intended by the user based on the result of this comparison, and depending on the determination, if it has been determined that the inference model is not suitable for shooting a shooting target intended by the user, requesting generation of an inference model that is suitable for the shooting target intended by the user to an external learning device.

* * * * *